(12) United States Patent
Zheng

(10) Patent No.: US 10,389,588 B2
(45) Date of Patent: Aug. 20, 2019

(54) METHOD AND SYSTEM FOR PROCESSING UPLINK AND DOWNLINK NETWORK DATA, AND ELECTRONIC DEVICE

(71) Applicant: Huawei Technologies Co., Ltd., Shenzhen (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 147 days.

(21) Appl. No.: 15/142,216

(22) Filed: Apr. 29, 2016

(65) Prior Publication Data

US 2016/0269234 A1   Sep. 15, 2016

Related U.S. Application Data

(63) Continuation of application No. PCT/CN2014/086356, filed on Sep. 12, 2014.

(30) Foreign Application Priority Data

Oct. 30, 2013   (CN) .......................... 2013 1 0530460

(51) Int. Cl.
*H04L 12/723* (2013.01)
*H04W 72/04* (2009.01)
*H04L 12/24* (2006.01)
*H04L 29/06* (2006.01)
*H04L 12/46* (2006.01)
(Continued)

(52) U.S. Cl.
CPC ........ *H04L 41/085* (2013.01); *H04L 12/4633* (2013.01); *H04L 41/08* (2013.01); *H04L 45/50* (2013.01); *H04L 45/502* (2013.01); *H04L 61/2592* (2013.01); *H04L 65/605* (2013.01); *H04L 65/608* (2013.01); *H04L 65/80* (2013.01); *H04L 69/22* (2013.01); *H04L 69/323* (2013.01); *H04W 72/042* (2013.01); *H04W 72/0413* (2013.01); *H04W 72/085* (2013.01)

(58) Field of Classification Search
CPC combination set(s) only.
See application file for complete search history.

(56) References Cited

U.S. PATENT DOCUMENTS 9,313,124 B2 *  4/2016  Bosshart ................. H04L 45/74
2005/0165952 A1   7/2005  Anschutz
(Continued)

FOREIGN PATENT DOCUMENTS

CN         1832439 A      9/2006
CN       101640820 A      2/2010
(Continued)

*Primary Examiner* — Brandon M Renner
*Assistant Examiner* — The Hy Nguyen
(74) *Attorney, Agent, or Firm* — Slater Matsil, LLP

(57) ABSTRACT

Embodiments provide a method and a device for processing network uplink and downlink data, where the method includes a central node device and a remote node device. The central node device is an edge device of a backbone network, and the remote node device is an edge device of a user network. The method includes: performing, by the central node device, downlink digital signal processing on a first data frame received from a network side to obtain a downlink to-be-sent data frame, and sending, the downlink to-be-sent data frame to the remote node device.

8 Claims, 15 Drawing Sheets

(51) Int. Cl.
*H04L 29/12* (2006.01)
*H04L 29/08* (2006.01)
*H04W 72/08* (2009.01)

(56) References Cited

U.S. PATENT DOCUMENTS

| | | | |
|---|---|---|---|
| 2008/0155052 A1* | 6/2008 | Ramesh | H04L 43/026 709/217 |
| 2009/0074009 A1* | 3/2009 | Kuliner | H04L 47/14 370/474 |
| 2009/0316695 A1 | 12/2009 | Li et al. | |
| 2010/0142944 A1* | 6/2010 | Zou | H04L 12/2861 398/25 |
| 2011/0116796 A1* | 5/2011 | Zheng | H04L 12/4633 398/45 |
| 2013/0336186 A1 | 12/2013 | Damnjanovic | |
| 2015/0081863 A1* | 3/2015 | Garg | H04L 41/00 709/223 |

FOREIGN PATENT DOCUMENTS

| | | |
|---|---|---|
| CN | 101656660 A | 2/2010 |
| EP | 1298853 A1 | 4/2003 |
| WO | 2004004214 A1 | 1/2004 |

\* cited by examiner

METHOD AND SYSTEM FOR PROCESSING UPLINK AND DOWNLINK NETWORK DATA, AND ELECTRONIC DEVICE

This application is a continuation of International Application No. PCT/CN2014/086356, filed on Sep. 12, 2014, which claims priority to Chinese Patent Application No. 201310530460.0, filed on Oct. 30, 2013, both of which are hereby incorporated by reference in their entireties.

TECHNICAL FIELD

The present invention relates to the field of communications technologies, and in particular, to a method and system for processing uplink and downlink network data, and an electronic device.

BACKGROUND

With the continuous development of science and technologies, network communications technologies are rapidly developed, which can support not only broadband network services, but also real-time voice services.

Nowadays, in network communications technologies, a remote node device disposed nearby a client device, and a central node device such as a network server used for communication forwarding are included. An interface circuit unit, an analog-to-digital conversion unit/a digital-to-analog conversion unit, a digital signal processing unit, a forwarding unit, and the like are mainly configured for the remote node device.

However, for the digital signal processing unit such as a digital signal processor (DSP) in the prior art, with the continuous improvement of network transmission technologies, the digital signal processing unit needs to be continuously updated and maintained. Because remote node devices are independently disposed nearby a client device in a scattered manner, a problem that operation and maintenance management of the remote node devices is complex exists; in addition, as a quantity of remote node devices increases, operation and maintenance management of the remote node devices is more complex. As can be seen, currently, a technical problem that operation and maintenance management of a remote node device is complex exists.

SUMMARY

Embodiments provide a method and system for processing uplink and downlink network data, and an electronic device, to resolve a technical problem that operation and maintenance management of a remote node device is complex in the prior art.

According to a first aspect, embodiments provide a method for processing downlink network data, where the method is applied to a data transmission network. The data transmission network includes a central node device and a remote node device. The central node device is an edge device of a backbone network in the data transmission network, and the remote node device is an edge device of a user network in the data transmission network. The method includes: receiving, by the central node device, a first data frame from a network side, and performing, by the central node device, downlink digital signal processing on the first data frame to obtain a downlink to-be-sent data frame. The method also includes sending, by the central node device, the downlink to-be-sent data frame to the remote node device.

With reference to the first aspect, in a first possible implementation manner of the first aspect, before the performing, by the central node device, downlink digital signal processing on the first data frame to obtain a downlink to-be-sent data frame, the method further includes: copying or remapping, by the central node device, a first frame header of the first data frame to obtain a second frame header, where a same parameter in the second frame header obtained by means of remapping and in the first frame header corresponds to different parameter values. The sending, by the central node device, the downlink to-be-sent data frame to the remote node device includes: encapsulating, by the central node device, the downlink to-be-sent data frame by using the second frame header, to obtain a second data frame, and sending the second data frame to the remote node device, so as to send the downlink to-be-sent data frame to the remote node device.

With reference to the first possible implementation manner of the first aspect, a second possible implementation manner of the first aspect is further provided, and in the second possible implementation manner of the first aspect, after the copying or remapping, by the central node device, a first frame header of the first data frame to obtain a second frame header, and before the performing, by the central node device, downlink digital signal processing on the first data frame to obtain a downlink to-be-sent data frame, the method further includes: when the first data frame is a broadband data frame, performing, by the central node device, physical layer framing processing on the first data frame; or when the first data frame is a voice data frame, performing, by the central node device, Real-Time Transport Protocol layer decapsulation processing on the first data frame.

With reference to the first possible implementation manner of the first aspect, a third possible implementation manner of the first aspect is further provided, and in the third possible implementation manner of the first aspect, the copying or remapping, by the central node device, a first frame header of the first data frame to obtain a second frame header specifically includes: when a network between the central node device and the remote node device is different from a network of the network side, remapping, by the central node device, the first frame header to obtain the second frame header; or when a network between the central node device and the remote node device is the same as a network of the network side, copy or remap the first frame header to obtain the second frame header.

According to a second aspect, embodiments provide a method for processing uplink network data, where the method is applied to a data transmission network, and the data transmission network includes a central node device and a remote node device, where the central node device is an edge device of a backbone network in the data transmission network, and the remote node device is an edge device of a user network in the data transmission network; and the method includes: receiving, by the central node device, a first data frame from the remote node device, and performing, by the central node device, uplink digital signal processing on a second data frame included in the first data frame to obtain an uplink to-be-sent data frame, where a frame header of the first data frame is different from a frame header of the second data frame. The method also includes sending, by the central node device, the uplink to-be-sent data frame to a network side.

With reference to the second aspect, in a first possible implementation manner of the second aspect, before the performing, by the central node device, uplink digital signal processing on a second data frame included in the first data frame to obtain an uplink to-be-sent data frame, the method further includes: removing, by the central node device, the frame header of the first data frame to obtain the second data frame.

With reference to the first possible implementation manner of the second aspect, a second possible implementation manner of the second aspect is further provided, and in the second possible implementation manner of the second aspect, after the removing, by the central node device, the frame header of the first data frame to obtain the second data frame, and before the performing, by the central node device, uplink digital signal processing on a second data frame included in the first data frame to obtain an uplink to-be-sent data frame, the method further includes: when the first data frame received by the central node device is a broadband data frame, performing, by the central node device, physical layer deframing processing on the second data frame.

With reference to the first possible implementation manner of the second aspect, a third possible implementation manner of the second aspect is further provided, and in the third possible implementation manner of the second aspect, after the performing, by the central node device, uplink digital signal processing on a second data frame included in the first data frame to obtain an uplink to-be-sent data frame, and before the sending, by the central node device, the uplink to-be-sent data frame to a network side, the method further includes: when the first data frame received by the central node device is a voice data frame, performing, by the central node device, encapsulation processing on the second data frame according to the Real-Time Transport Protocol.

According to a third aspect, the present invention provides a central node device, where the central node device is applied to a data transmission network, and the data transmission network includes the central node device and a remote node device, where the central node device is an edge device of a backbone network in the data transmission network, and the remote node device is an edge device of a user network in the data transmission network; and the central node device includes a receiving unit, configured to receive a first data frame from a network side. The central node device also includes a digital signal processing unit, configured to perform downlink digital signal processing on the first data frame to obtain a downlink to-be-sent data frame. The central node device also includes a sending unit, configured to send the downlink to-be-sent data frame to the remote node device.

With reference to the third aspect, in a first possible implementation manner of the third aspect, the central node device further includes: a frame header adjustment unit, configured to: before the downlink digital signal processing is performed on the first data frame to obtain the downlink to-be-sent data frame, copy or remap a first frame header of the first data frame to obtain a second frame header, where a same parameter in the second frame header obtained by means of remapping and in the first frame header corresponds to different parameter values. The sending, by the central node device, the downlink to-be-sent data frame to the remote node device includes: the sending unit being specifically configured to encapsulate the downlink to-be-sent data frame by using the second frame header, to obtain a second data frame, and send the second data frame to the remote node device, so as to send the downlink to-be-sent data frame to the remote node device.

With reference to the first possible implementation manner of the third aspect, a second possible implementation manner of the third aspect is further provided, and in the second possible implementation manner of the third aspect, the central node device further includes: a pre-processing unit, configured to: after the first frame header of the first data frame is copied or remapped to obtain the second frame header, and before the downlink digital signal processing is performed on the first data frame to obtain the downlink to-be-sent data frame, perform physical layer framing processing on the first data frame when the first data frame is a broadband data frame; or perform Real-Time Transport Protocol layer decapsulation processing on the first data frame when the first data frame is a voice data frame.

With reference to the first possible implementation manner of the third aspect, a third possible implementation manner of the third aspect is further provided, and in the third possible implementation manner of the third aspect, the pre-processing unit is specifically configured to: when a network between the central node device and the remote node device is different from a network of the network side, remap the first frame header to obtain the second frame header; or when a network between the central node device and the remote node device is the same as a network of the network side, copy or remap the first frame header to obtain the second frame header.

According to a fourth aspect, embodiments provide a central node device, where the central node device is applied to a data transmission network, and the data transmission network includes the central node device and a remote node device, where the central node device is an edge device of a backbone network in the data transmission network, and the remote node device is an edge device of a user network in the data transmission network; and the central node device includes: a receiving unit, configured to receive a first data frame from the remote node device, and a digital signal processing unit, configured to perform uplink digital signal processing on a second data frame included in the first data frame to obtain an uplink to-be-sent data frame, where a frame header of the first data frame is different from a frame header of the second data frame. The central node device also includes a sending unit, configured to send the uplink to-be-sent data frame to a network side.

With reference to the fourth aspect, in a first possible implementation manner of the fourth aspect, the central node device further includes a frame header removal unit, configured to: before the uplink digital signal processing is performed on the second data frame included in the first data frame to obtain the uplink to-be-sent data frame, remove the frame header of the first data frame to obtain the second data frame.

With reference to the first possible implementation manner of the fourth aspect, a second possible implementation manner of the fourth aspect is further provided, and in the second possible implementation manner of the fourth aspect, the central node device further includes a physical deframing unit, configured to: after the frame header of the first data frame is removed to obtain the second data frame, and before the uplink digital signal processing is performed on the second data frame included in the first data frame to obtain the uplink to-be-sent data frame, perform physical layer deframing processing on the second data frame when the first data frame received by the central node device is a broadband data frame.

With reference to the first possible implementation manner of the fourth aspect, a third possible implementation manner of the fourth aspect is further provided, and in the third possible implementation manner of the fourth aspect, the central node device further includes: an encapsulation unit, configured to: after the uplink digital signal processing is performed on the second data frame included in the first data frame to obtain the uplink to-be-sent data frame, and before the uplink to-be-sent data frame is sent to the network side, perform encapsulation processing on the second data frame according to the Real-Time Transport Protocol when the received first data frame is a voice data frame.

According to a fifth aspect, the embodiments provide a system for processing downlink network data, where the system is applied to a data transmission network, and the data transmission network includes a central node device and a remote node device, where the central node device is an edge device of a backbone network in the data transmission network, and the remote node device is an edge device of a user network in the data transmission network. The system includes: the central node device, configured to perform downlink digital signal processing on a first data frame received from a network side, to obtain a first downlink to-be-sent data frame, and send the first downlink to-be-sent data frame to the remote node device; and the remote node device, configured to perform downlink frame header removal processing on the received first downlink to-be-sent data frame to obtain a second downlink to-be-sent data frame, and send the second downlink to-be-sent data frame to a client device.

According to a sixth aspect, embodiments provide a system for processing uplink network data, where the system is applied to a data transmission network, and the data transmission network includes a central node device and a remote node device, where the central node device is an edge device of a backbone network in the data transmission network, and the remote node device is an edge device of a user network in the data transmission network. The system includes the remote node device, configured to perform uplink frame header addition processing on a first data frame received from a client device, to obtain a first uplink to-be-sent data frame, and send the first uplink to-be-sent data frame to the central node device. The system also includes the central node device, configured to perform uplink digital signal processing on a second data frame in the received first uplink to-be-sent data frame to obtain a second uplink to-be-sent data frame, and send the second uplink to-be-sent data frame to a network side.

According to the foregoing technical solutions, in a process of transmitting downlink network data, a central node device receives a first data frame from a network side and performs downlink digital signal processing, and then sends a data frame obtained after the digital signal processing to a remote node device, so that the remote node device does not need to further perform digital signal processing on a downlink network data frame, and correspondingly, a digital signal processing unit does not need to be configured in the remote node device, which resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the technical solutions provided in the embodiments of the present invention, a digital signal processing unit in a remote node device is relocated to a central node device, and the central node device performs digital signal processing on uplink and downlink network data frames, so that the remote node device does not need to further perform digital signal processing on a to-be-sent or received data frame, and accordingly, the digital signal processing unit does not need to be configured for the remote node device, thereby resolving a technical problem that operation and maintenance management of a remote node device is complex in the prior art, and reducing complexity of the operation and maintenance management of the remote node device. In addition, because the central node device is located in a network operation and maintenance center, operation and maintenance management is convenient; and a quantity of central node devices greatly reduces compared with a quantity of remote node devices, and therefore, complexity of the operation and maintenance management is greatly reduced.

Main implementation principles and specific implementation manners of the technical solutions in the embodiments of the present invention, and corresponding beneficial effects that the technical solutions in the embodiments of the present invention can achieve are described in detail below with reference to the accompanying drawings.

Embodiment 1

Figure 1:
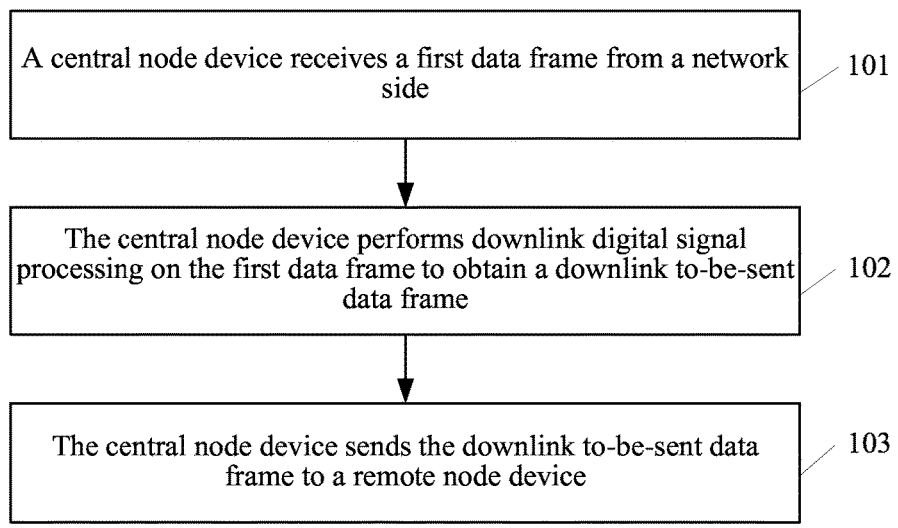
FIG. 1 is a schematic flowchart of a method for processing downlink network data by a central node device according to Embodiment 1.

Referring to FIG. 1, this embodiment provides a method for processing downlink network data, where the method is applied to a data transmission network, and the data transmission network includes a central node device and a remote node device, where the central node device is an edge device of a backbone network in the data transmission network, and the remote node device is an edge device of a user network in the data transmission network; and the method includes:

101: The central node device receives a first data frame from a network side.

102: The central node device performs downlink digital signal processing on the first data frame to obtain a downlink to-be-sent data frame.

103: The central node device sends the downlink to-be-sent data frame to the remote node device.

In a specific implementation process, the remote node device may be an edge device of the user network, for example, an optical network terminal (ONT), a digital subscriber line access multiplexer (DSLAM), or a base station. The central node device relative to the remote node device is an edge device of the backbone network, for example, an OLT/an IP edge device, or a server, and the network side of the central node device is connected to a core network. Therefore, the central node device performs step 101 of receiving the first data frame from the network side by using a network side interface. To transmit the downlink to-be-sent data frame obtained after the downlink digital signal processing between the central node device and the remote node device, the central node device may copy or remap a first frame header of the first data frame before performing downlink digital signal processing, to obtain a second frame header.

Specifically, when a network between the central node device and the remote node device is different from a network of the network side of the central node device, the central node device remaps the first frame header to obtain the second frame header; or when a network between the central node device and the remote node device is the same as a network of the network side, the central node device copies the first frame header to obtain the second frame header or remaps the first frame header to obtain the second frame header, and in this case, a related value of the first frame header is remapped without changing a type of the frame header.

After obtaining the second frame header, and before performing downlink digital signal processing on the first data frame, the central node device may further perform encapsulation or decapsulation processing on the first data frame. Specifically, for first data frames of different services, the central node device correspondingly performs different processing: when the first data frame is a voice data frame of a voice service, performing Real-Time Transport Protocol layer decapsulation processing on the first data frame; or when the first data frame is a broadband data frame of a broadband service, performing physical layer framing processing, that is, encapsulation processing, on the first data frame. Subsequently, step 102 is executed to perform downlink digital signal processing on the first data frame obtained after the encapsulation or decapsulation processing.

In step 102, different downlink data signal processing is performed for different service types. When the first data frame is a voice data frame of a voice service, processing such as voice decoding or echo cancellation is performed on the first data frame to obtain the downlink to-be-sent data frame; or when the first data frame is a broadband data frame of a broadband service, processing such as physical layer line encoding or channel encoding, modulation, or physical layer framing is performed on the first data frame to obtain the downlink to-be-sent data frame. For the broadband data frame of the broadband service, after the downlink digital signal processing, the central node device further adds a physical layer preamble to the downlink to-be-sent data frame, and continues to perform step 103.

103: The central node device sends the downlink to-be-sent data frame to the remote node device. Specifically, when sending the downlink to-be-sent data frame, the central node device needs to first add, to the downlink to-be-sent data frame, a second data frame obtained by means of copying or remapping, and then sends downlink to-be-sent data to the remote node device by using a forwarding unit and a user side interface.

Figure 2:
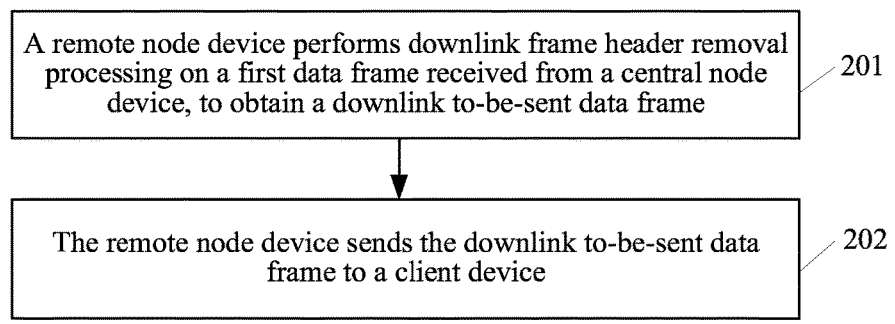
FIG. 2 is a schematic flowchart of a method for processing downlink network data by a remote node device according to Embodiment 1.

Referring to FIG. 2, when downlink network data, that is, a downlink to-be-sent data frame (which is a first data frame for a remote node device) sent by a central node device, is sent to the remote node device, an embodiment of the present invention provides a method for processing downlink network data. The method includes the following steps.

201: A remote node device performs downlink frame header removal processing on a first data frame received from a central node device, to obtain a downlink to-be-sent data frame.

202: The remote node device sends the downlink to-be-sent data frame to a client device.

In a specific implementation process, the remote node device receives, by using a network side interface of the remote node device, the first data frame sent by the central node device; forwards the first data frame to a corresponding processing port; then performs step 201 of performing downlink frame header removal processing on the first data frame by using the corresponding processing port, to obtain the downlink to-be-sent data frame after frame header removal; and continues to perform step 202.

In step 202, the remote node device sends the downlink to-be-sent data frame to the client device. Specifically, a to-be-sent data frame of a digital signal may be first converted to a to-be-sent data frame of an analog signal, and then the to-be-sent data frame of the analog signal is sent to the client device by using an interface circuit.

Figure 3:
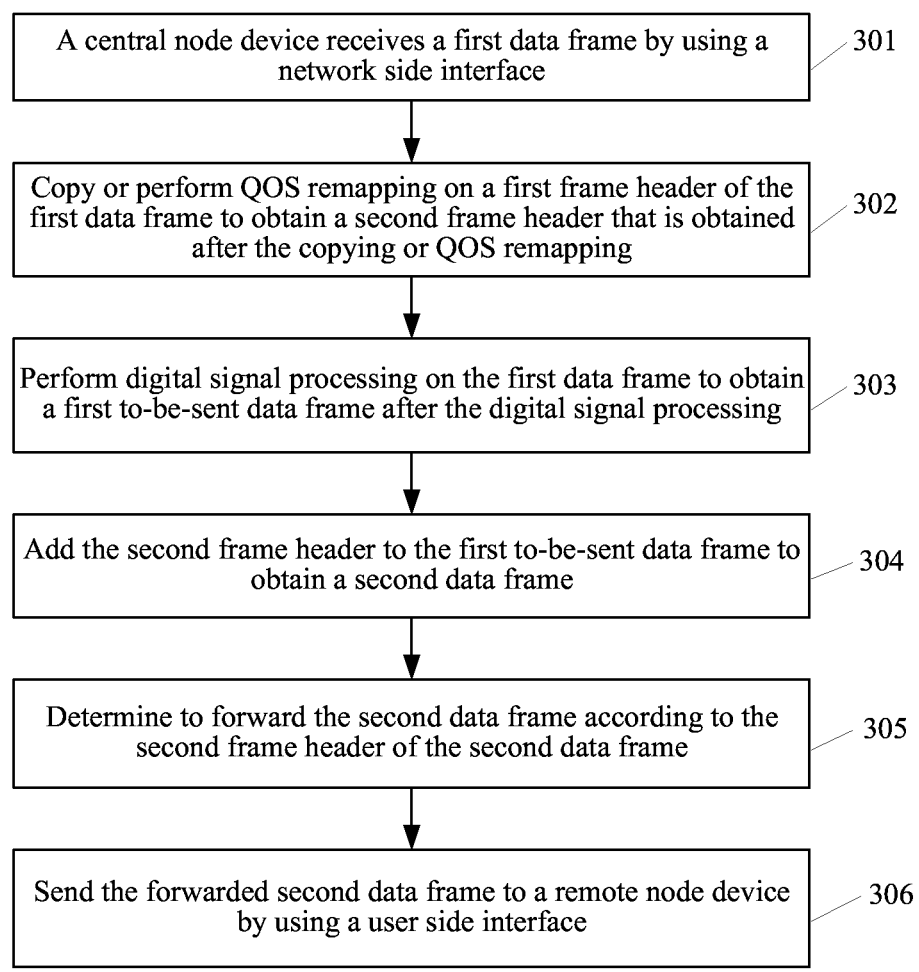
FIG. 3 is a schematic diagram of a specific procedure of processing downlink network data by a central node device according to Embodiment 1.
Figure 4:
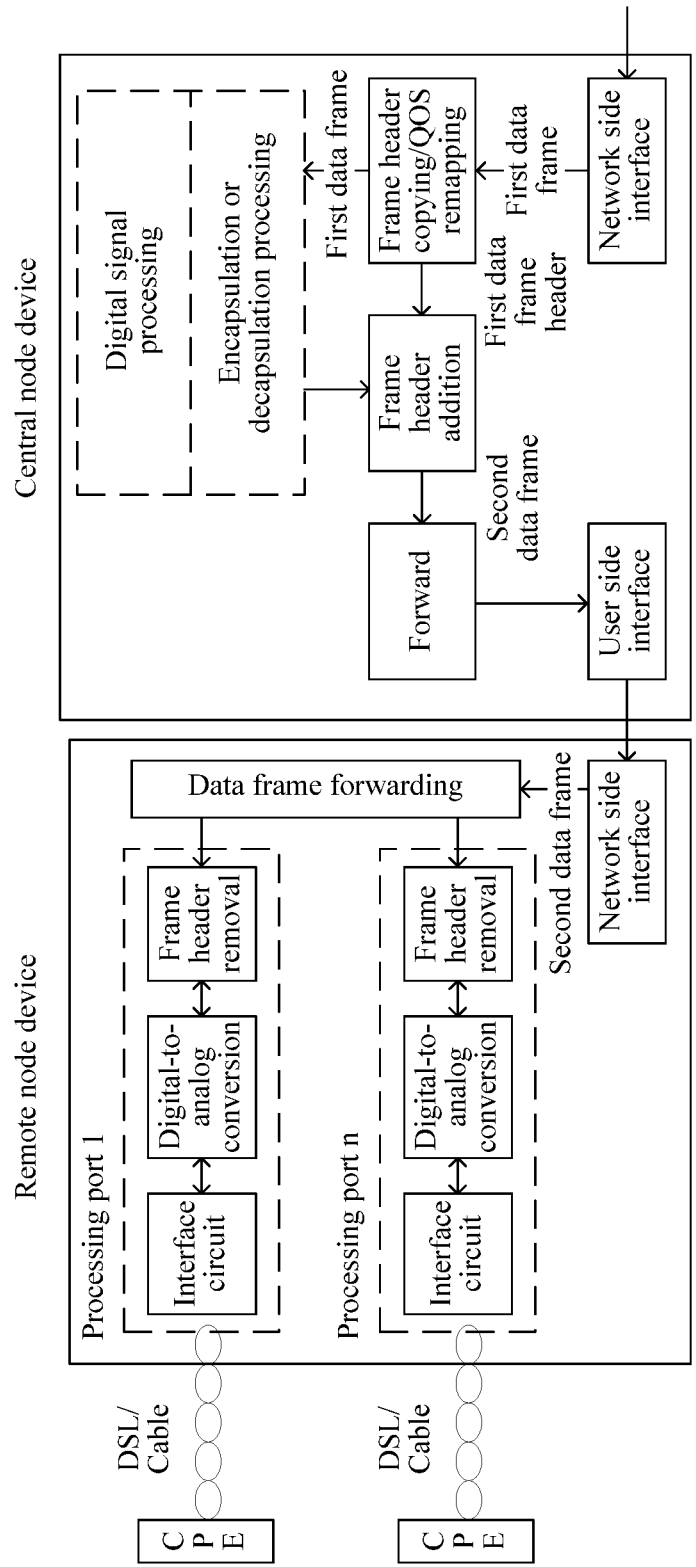
FIG. 4 is a schematic diagram of transmitting downlink network data according to Embodiment 1.

Referring to FIG. 3 and FIG. 4, a process for processing downlink network data by a central node device and a remote node device is described in detail below with reference to specific examples. When a central node device receives a first data frame sent by a core network, the central node device performs the following steps.

301: The central node device receives the first data frame by using a network side interface.

302: Copy or remap a first frame header of the first data frame to obtain a second frame header after the copying or remapping, where the remapping is quality of service (QOS) remapping, that is, QOS remapping, and a same parameter in the second frame header obtained by means of remapping and in the first frame header corresponds to different parameter values.

303: Perform digital signal processing on the first data frame to obtain a first to-be-sent data frame after the digital signal processing.

304: Add the second frame header to the first to-be-sent data frame to obtain a second data frame.

305: Forward the second data frame according to the second frame header of the second data frame.

306: Send the forwarded second data frame to a remote node device by using a user side interface.

In a specific implementation process, to implement data communication between client devices of two different local area networks, data frames sent by each other need to be forwarded by the central node device; therefore, the central node device needs to forward a received data frame to a corresponding client device. In this process, the central node device first performs step 301 of receiving the first data frame by using a network side interface, and continues to perform step 302.

In step 302, the first frame header of the first data frame is copied or remapped. Specifically, when a same network, for example, Ethernet or a Multi-Protocol Label Switching (MPLS) network, is supported both between a remote node and a central node and on a network side of the central node, the first frame header of the first data frame is copied, and then QOS parameter adjustment is performed on the copied first frame header, for example, a parameter of a virtual local area network (VLAN) is remapped to a new value, and the second frame header is obtained after the remapping; or when a network supported between a central node and a remote node is different from a network supported on a network side of the central node, the first frame header of the first data frame is copied, and then QOS parameter remapping is performed on the copied first frame header, for example, an MPLS network is supported on the network side of the central node, but Ethernet is supported between the remote node and the central node; in this case, an MPLS frame header of the first data frame is remapped to an Ethernet frame header.

While the first frame header of the first data frame is copied or remapped, step 303 is performed: Perform digital signal processing on the first data frame to obtain a first to-be-sent data frame after the digital signal processing. Specifically, the central node device performs different processing for different types of first data frames: When the first data frame is a voice data frame, the central node device performs processing such as voice decoding, echo cancellation, or dual tone multiple frequency (DTMF) generation and detection on a first voice data frame; or when the first data frame is a broadband data frame, the central node device performs processing such as physical layer line encoding or channel encoding, modulation, or physical layer framing on a first broadband data frame.

Because the digital signal processing is already performed on the first data frame at the central node device, that is, a digital signal processor DSP is configured in the central node device, a digital signal processor DSP does not need to be configured in the remote node device, which therefore avoids a problem that because remote node devices are widely distributed in a scattered manner, operation and maintenance management of digital signal processors DSPs configured in the remote node devices is complex, so that maintenance costs of the remote node device can be greatly reduced.

After step 303 is performed, step 304 is performed: Add the second frame header to the first to-be-sent data frame to obtain a second data frame. Because the second frame header obtained by means of copying/QOS remapping is added to a processed first to-be-sent data frame, the first to-be-sent data frame obtained after the digital signal processing can be carried by a network packet to traverse a packet forwarding-based network between the remote node and the central node, for example, Ethernet or an IP network, instead of a conventional time division multiplexing (TDM) network, thereby effectively reducing network costs. For example, when the remote node is a digital subscriber line access multiplexer (DSLAM), because an aggregation network between the digital subscriber line access multiplexer and the IP edge strictly restricts for a VLAN when the central node is an IP edge, the first frame header of the first data frame needs to be copied and saved, and after the first data frame is processed by the digital signal processor DSP, the obtained second frame header is added to the processed first to-be-sent data frame to obtain the second data frame, so that the second data frame can traverse the aggregation network having a strict plan for the VLAN.

Therefore, after the second data frame is obtained, continue to perform step 305 of forwarding the second data frame according to the second frame header of the second data frame. Specifically, a forwarding path of the second data frame is determined according to destination address information in the second frame header of the second data frame. For example, the central node device is connected to N routers, where N is a natural number greater than or equal to 1, and accordingly, there are N forwarding paths for the central node device. If the destination address information in the second frame header indicates that the second data frame may be forwarded, by using a second path, to a remote node device corresponding to the destination address information, a forwarding unit determines, according to the second frame header of the second data frame, that the second data frame may be forwarded by using the second path. Subsequently, continue to perform 306: Send the forwarded second data frame to a remote node device by using a user side interface.

Figure 5:
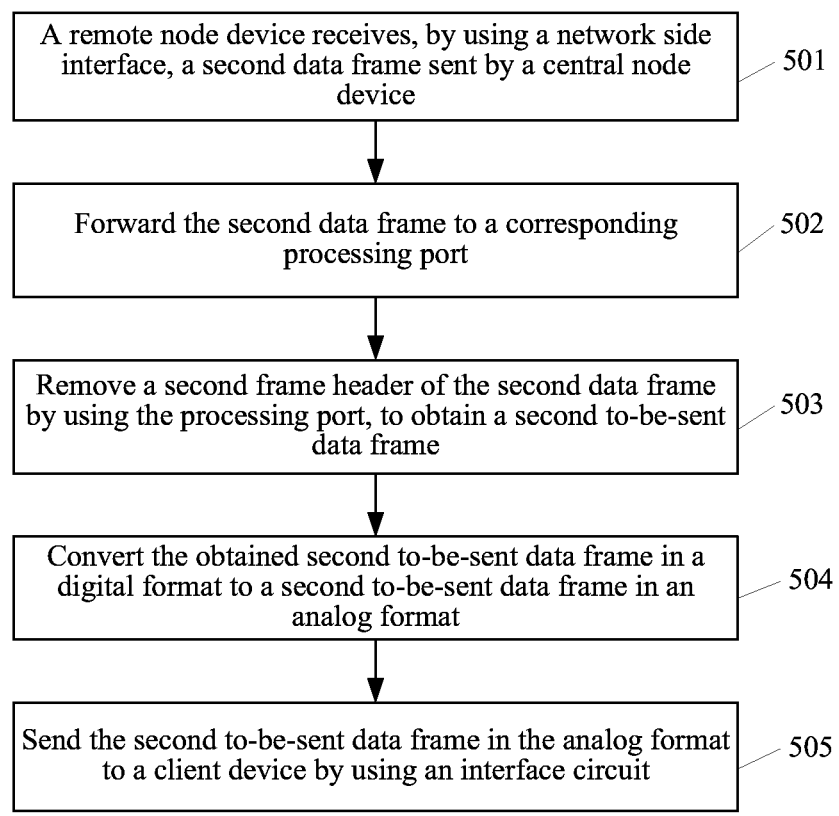
FIG. 5 is a schematic diagram of a specific procedure of processing downlink network data by a remote node device according to Embodiment 1.

After the central node device sends the second data frame to the remote node device, the remote node device receives the second data frame and performs corresponding processing on the second data frame. Referring to FIG. 4 and FIG. 5, the remote node device performs the following steps.

501: The remote node device receives, by using a network side interface, the second data frame sent by the central node device.

502: Forward the second data frame to a corresponding processing port.

503: Remove the second frame header of the second data frame by using the processing port, to obtain a second to-be-sent data frame.

504: Convert a second to-be-sent data frame in a digital format to a second to-be-sent data frame in an analog format.

505: Send the second to-be-sent data frame in the analog format to a client device by using an interface circuit.

In a specific implementation process, because the second data frame that is sent by the central node device to the remote node device is a data frame obtained after the central node device performs digital signal processing, the remote node device does not need to further perform processing such as digital signal decoding on the second data frame. Therefore, after step 501 of receiving the second data frame by using the network side interface, the remote node device does not need to perform processing such as digital signal decoding on the data frame, and directly performs step 502.

Because one remote node device is connected to multiple client devices, the received second data frame needs to be forwarded to a corresponding client device; therefore, in step 502, the data frame is forwarded to the corresponding processing port, where the processing port is connected to the corresponding client device. Specifically, a destination address of the second data frame may be acquired from the second frame header of the second data frame, and then the second data frame is forwarded to a processing port corresponding to the destination address. Next, step 503 is performed.

503: The processing port removes the second frame header of the second data frame to obtain a second to-be-sent data frame. Specifically, when the received second data frame is a data frame transmitted by using Ethernet (ETH), an Ethernet frame header of the data frame is correspondingly removed; or when the received data frame is a data frame transmitted by using an MPLS network, an MPLS frame header of the data frame is correspondingly removed. The second to-be-sent data frame that is obtained after the second frame header of the second data frame is removed is a digital signal, and the remote node device needs to further convert the digital signal to an analog signal. Therefore, after step 503, step 504 is further performed.

504: Convert a second to-be-sent data frame in a digital format to a second to-be-sent data frame in an analog format. Because the client device can usually process only an analog signal, the second to-be-sent data frame in the digital format needs to be converted to the second to-be-sent data frame in the analog format at the remote node device; then perform step 505: Send the second to-be-sent data frame in the analog format to a client device by using an interface circuit.

In a specific implementation process, the network side interface of the remote node device may receive a voice data frame or a broadband data frame, that is, the remote node device may be a downlink remote device of a voice access network or may be a downlink remote device of a broadband access network.

Figure 6:
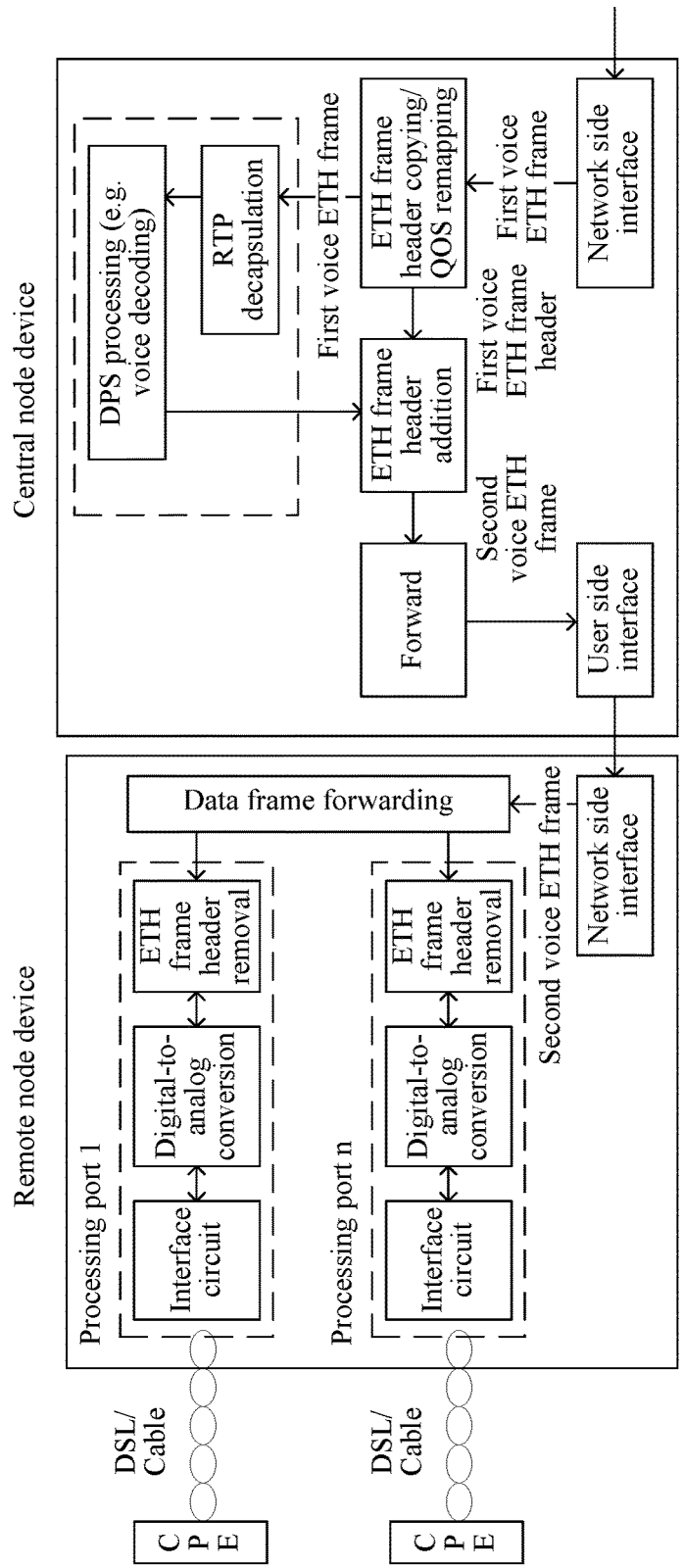
FIG. 6 is a schematic diagram of transmitting a downlink network voice data frame according to Embodiment 1.

Referring to FIG. 6, a method for processing a voice data frame by a central node device and a remote node device is described below by using an example in which in a voice access network, a first data frame is a first voice data frame. It is assumed that a network between a central node device and a remote node device and a network on a network side of the central node device are both Ethernet, where a data frame forwarded and transferred in Ethernet is an Ethernet frame: an ETH frame.

In the central node device, first, a first voice data frame sent from the network side, that is, a first voice ETH frame, is received by using a network side interface. Then, a frame header of the first voice ETH frame is copied or remapped. Next, RTP decapsulation is performed on the first voice ETH frame that is transmitted according to the Real-Time Transport Protocol (Real-Time Transport Protocol, RTP), to obtain a voice data frame in the first voice ETH frame, and a digital signal processor DSP performs digital signal processing such as voice decoding, echo cancellation, DTMF generation and detection on the voice data to obtain a first to-be-sent voice data frame after the processing. Subsequently, a copied or remapped frame header is added to the first to-be-sent voice data frame obtained after the digital signal processing, to generate a second voice ETH frame. Next, the second voice ETH frame is forwarded according to the frame header of the second voice ETH frame. Finally, the forwarded second voice ETH frame is sent to the remote node device by using a user side interface.

In the remote node device, first, the second voice ETH frame sent by the central node device is received by using a network side interface. Then, the second voice ETH frame is forwarded, according to a destination address in the second frame header of the second voice ETH frame, to a processing port corresponding to the destination address. For example, the processing port corresponding to the destination address of the second voice ETH frame is a processing port n, where n is a natural number greater than or equal to 1, and accordingly, a forwarding unit correspondingly forwards the second voice ETH frame to a frame header removal unit of the processing port n. Next, the frame header removal unit receiving the second voice ETH frame correspondingly removes the frame header of the second voice ETH frame to obtain a second to-be-sent voice data frame. Subsequently, an analog-to-digital conversion (AD/DA) unit/a digital-to-analog conversion unit converts the second to-be-sent voice data frame in a digital format to a second to-be-sent voice data frame in an analog format. Finally, the second to-be-sent voice data frame in the analog format is sent to a corresponding user terminal device (Customer Premises Equipment, CPE) by using an interface circuit (Subscriber Line Interface Circuit, SLIC).

Figure 7:
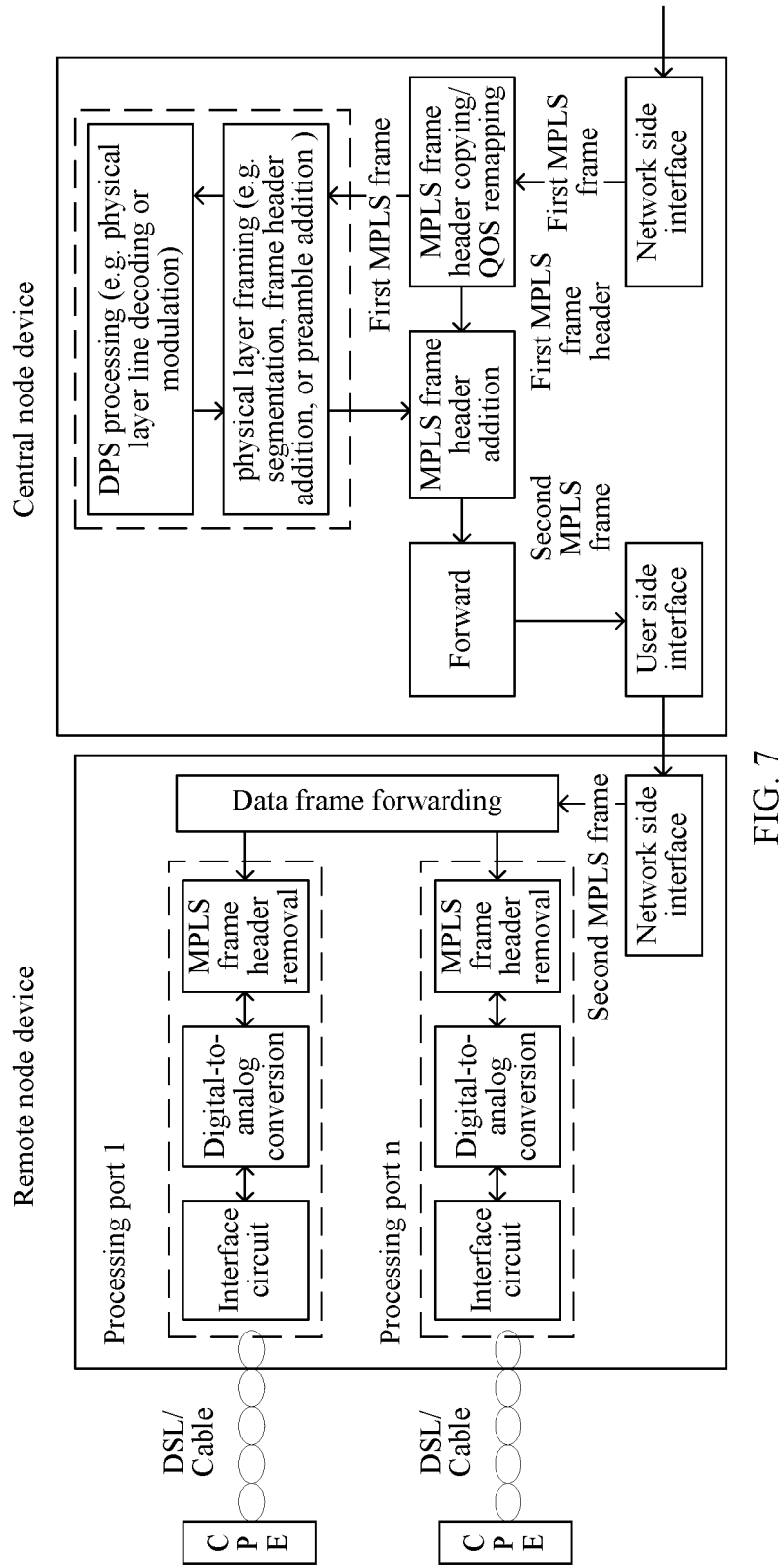
FIG. 7 is a schematic diagram of transmitting a downlink network broadband data frame according to Embodiment 1.

Referring to FIG. 7, a method for processing a broadband data frame by a central node device and a remote node device is described below by using an example in which a first data frame in a broadband access network is a first broadband data frame. It is assumed that a network between a central node device and a remote node device and a network on a network side of the central node device are both an MPLS network, where a data frame forwarded and transferred in the MPLS network is an MPLS frame.

Figure 8:
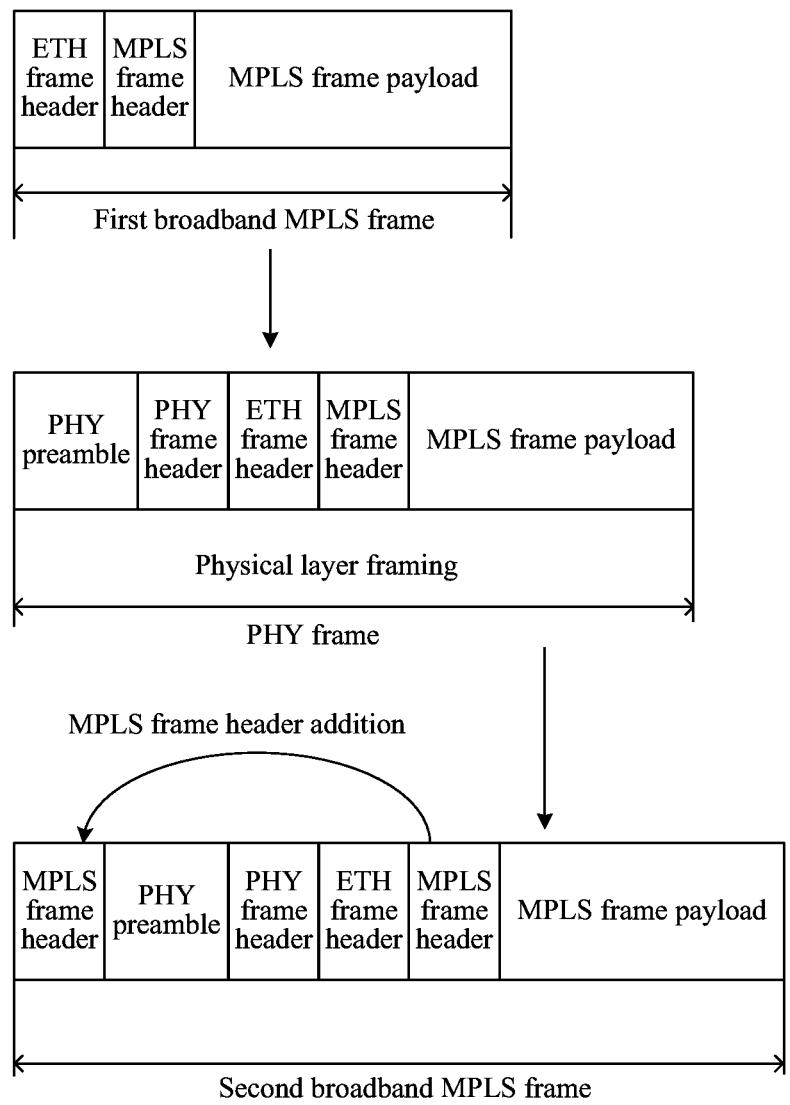
FIG. 8 is a schematic diagram of a process of processing a broadband data frame in an MPLS network according to Embodiment 1.

In the central node device, first, a first broadband data frame sent from the network side, that is, a first broadband MPLS frame, is received by using a network side interface. Then, a first frame header of the first broadband MPLS frame is copied or remapped to obtain a second frame header after the copying or remapping. Referring to FIG. 8, next, physical layer framing processing such as segmentation or physical layer protocol (Physical Layer, PHY) frame header addition is performed on the first broadband MPLS frame. Then, a digital signal processor DSP performs digital signal processing such as physical layer line encoding or channel encoding, or modulation on the broadband data, to obtain first broadband to-be-sent data after the processing. Subsequently, a physical layer preamble and the second frame header that is obtained by means of copying or remapping are added to the first broadband to-be-sent data obtained after the digital signal processing, to generate a second broadband MPLS frame. Next, the second broadband MPLS frame is forwarded according to the second frame header of the second broadband MPLS frame. Finally, the forwarded second broadband MPLS frame is sent to the remote node device by using a user side interface.

In the remote node device, first, the second broadband MPLS frame sent by the central node device is received by using a network side interface. Then, the second broadband MPLS frame is forwarded according to a destination address in the second frame header of the second broadband MPLS frame, to a processing port corresponding to the destination address. For example, the processing port corresponding to the destination address of the second broadband MPLS frame is a processing port n, where n is a natural number greater than or equal to 1, and accordingly, a forwarding unit correspondingly forwards the second broadband MPLS frame to a frame header removal unit of the processing port n. Next, the corresponding processing port removes the frame header of the second broadband MPLS frame to obtain a second broadband to-be-sent data frame. Subsequently, an AD unit/a DA unit converts the second broadband to-be-sent data frame in a digital format to a second broadband to-be-sent data frame in an analog format. Finally, an analog signal is sent to a corresponding user terminal device CPE by using an interface circuit SLIC.

Figure 9:
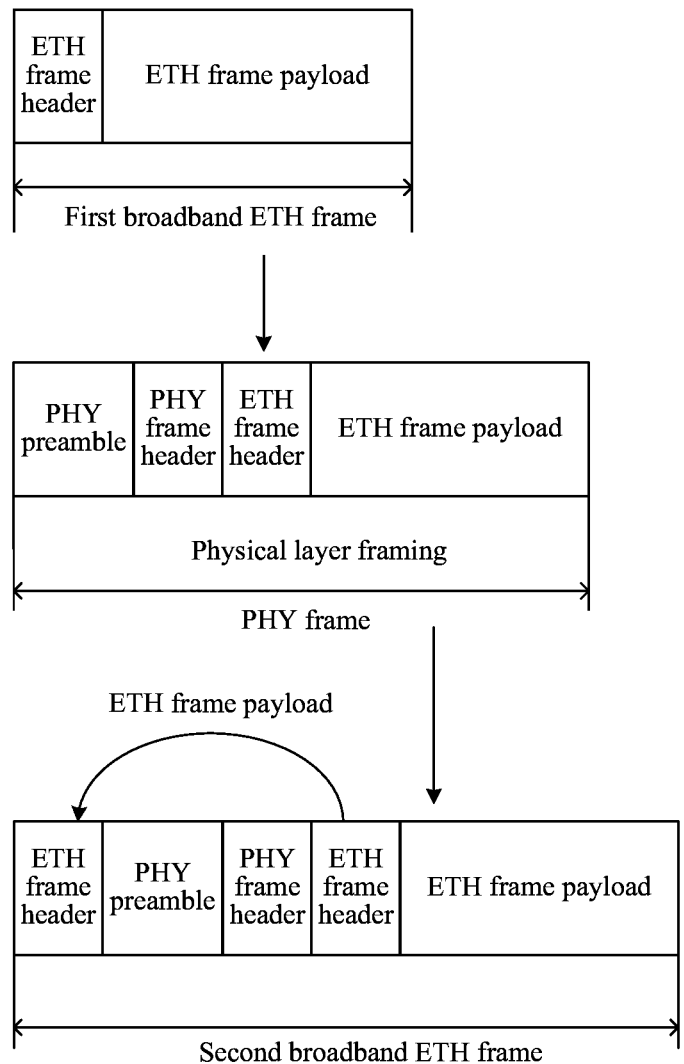
FIG. 9 is a schematic diagram of a process of processing a broadband data frame in Ethernet according to Embodiment 1.

In a specific implementation process, a voice data service may be also transferred on the MPLS network, and a broadband data service may be also transferred in Ethernet. When a network between a central node device and a remote node device and a network on a network side are Ethernet, a process for processing a first data frame by the central node device is shown in FIG. 9. First, a frame header of a first broadband ETH frame is copied or remapped; then, a physical layer PHY frame header is added; next, data signal processing is performed and a physical layer PHY preamble is added to obtain a PHY frame; then, an ETH frame header obtained by means of copying or remapping is added to the PHY frame to obtain a second broadband ETH frame; and finally, the forwarded second broadband ETH frame is sent to the remote node device by using a user side interface.

In addition, when a network between a central node device and a remote node device is different from a network of a network side of the central node device, for example, one network is an MPLS network, and the other network is Ethernet, a frame header of a received data frame is remapped to a network frame header that is suitable for transmission between the central node device and the remote node device, for example, an MPLS frame header is remapped to an Ethernet frame header. Except a difference in frame header copying/QOS remapping processing in the central node device, other processing principles are the same as those of a voice access network or a broadband access network, and are not described herein again.

In the foregoing embodiments, a central node device receives a first data frame from a network side and performs downlink digital signal processing, and then sends a data frame obtained after the digital signal processing to a remote node device, so that the remote node device does not need to further perform digital signal processing on a downlink network data frame, and correspondingly, a digital signal processing unit does not need to be configured in the remote node device, which therefore resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

Embodiment 2

Figure 10:
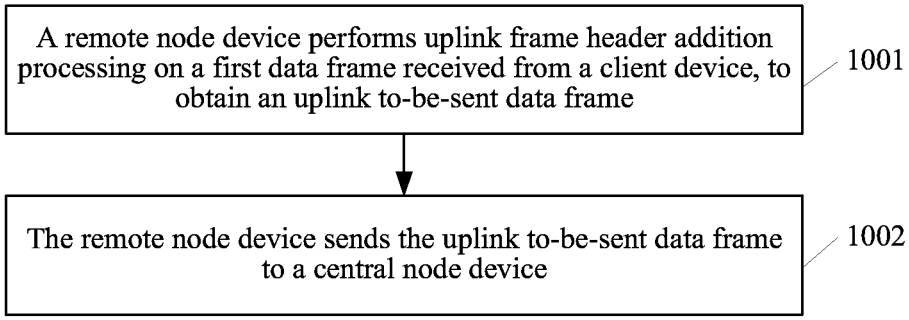
FIG. 10 is a schematic flowchart of a method for processing uplink network data by a remote node device according to Embodiment 2.

Referring to FIG. 10, this embodiment provides a method for processing uplink network data, where the method is applied to a data transmission network, and the data transmission network includes a central node device and a remote node device, where the central node device is an edge device of a backbone network in the data transmission network, and the remote node device is an edge device of a user network in the data transmission network; and the method includes the following steps.

1001: The remote node device performs uplink frame header addition processing on a first data frame received from a client device, to obtain an uplink to-be-sent data frame.

1002: The remote node device sends the uplink to-be-sent data frame to the central node device.

In a specific implementation process, when performing step 1001, the remote node device first receives, by using an interface circuit, the first data frame sent from the client device, then converts a first data frame in an analog format to a first data frame in a digital format, then performs uplink frame header addition processing on the first data frame in the digital format, to obtain the uplink to-be-sent data frame, and continues to perform step 1002 of sending the uplink to-be-sent data frame to the central node device by using a forwarding unit and a network side interface.

Figure 11:
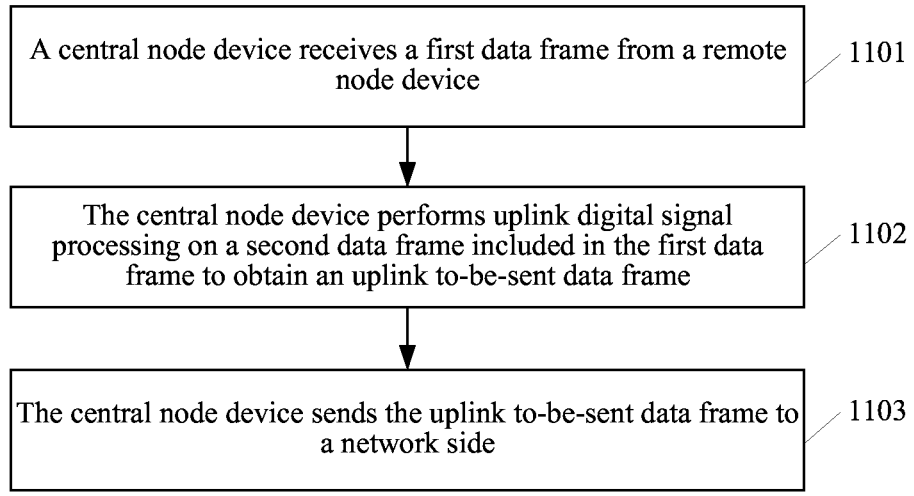
FIG. 11 is a schematic flowchart of a method for processing uplink network data by a central node device according to Embodiment 2.

Referring to FIG. 11, when a remote node device sends an uplink to-be-sent data frame (which is a first data frame for a central node device) to the central node device, a method for processing uplink data by the central node device includes the following steps.

1101: The central node device receives the first data frame from the remote node device.

1102: The central node device performs uplink digital signal processing on a second data frame included in the first data frame to obtain an uplink to-be-sent data frame, where a frame header of the first data frame is different from a frame header of the second data frame.

1103: The central node device sends the uplink to-be-sent data frame to a network side.

In a specific implementation process, in step 1101, the central node device receives the first data frame by using a user side interface, then the central node device removes the frame header of the first data frame to obtain the second data frame, then performs encapsulation or decapsulation processing on the second data frame, subsequently performs step 1102 of performing uplink digital signal processing on an encapsulated or decapsulated second data frame, to obtain the uplink to-be-sent data frame, and finally performs step 1103 of sending the uplink to-be-sent data frame to the network side by using a forwarding unit and a network side interface.

Figure 12:
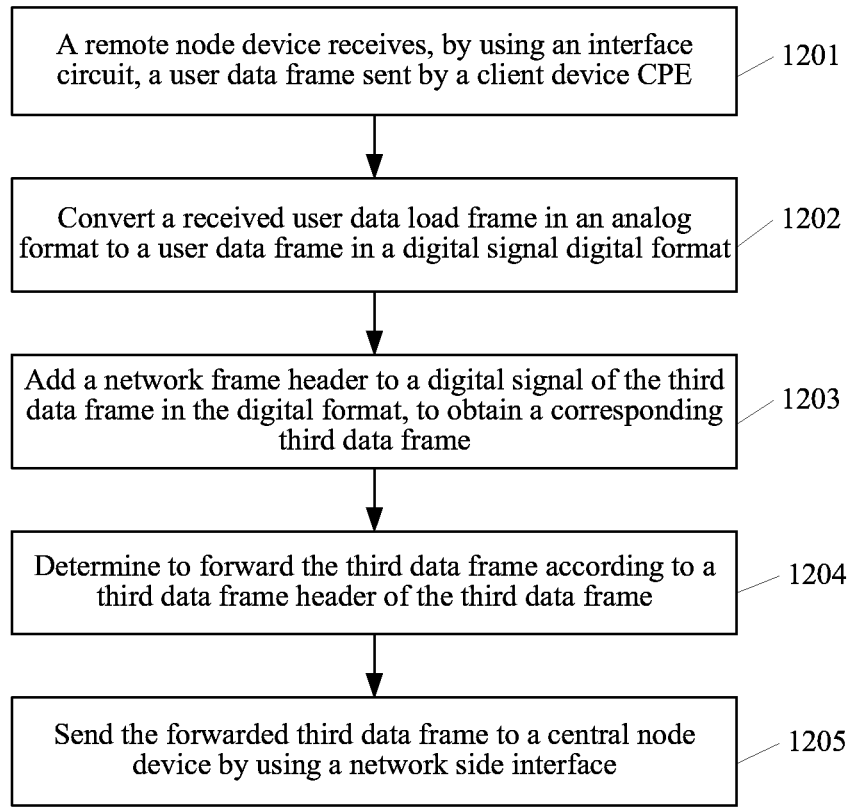
FIG. 12 is a schematic diagram of a process of processing uplink network data by a remote node device according to Embodiment 2.
Figure 13:
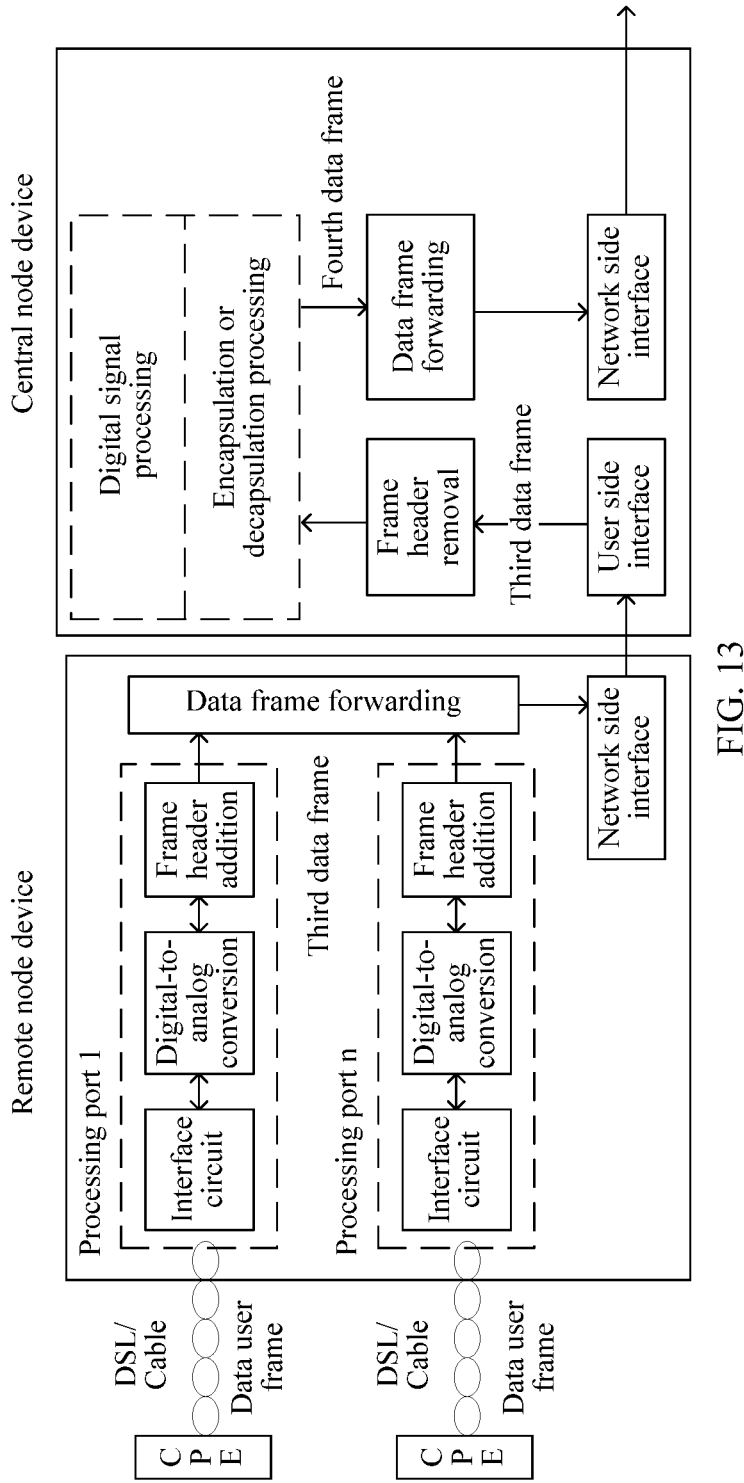
FIG. 13 is a schematic diagram of transferring an uplink network data frame according to Embodiment 2.

Referring to FIG. 12 and FIG. 13, a procedure for processing uplink network data by a remote node device and a central node device is described in detail below with reference to specific examples. When a client device CPE sends a user data frame to a remote node device, the remote node device performs the following steps.

1201: The remote node device receives, by using an interface circuit, the user data frame sent by the client device CPE.

1202: Convert the user data frame in an analog format to a user data frame in a digital format.

1203: Add a network frame header to the user data frame in the digital format in the digital format, to obtain a corresponding third data frame.

1204: Forward the third data frame according to a third data frame header of the third data frame.

1205: Send the forwarded third data frame to a central node device by using a network side interface.

In a specific implementation process, the remote node device is mainly configured to perform analog-to-digital signal conversion on the user data frame in the analog format that is sent by the user equipment CPE, and generate and forward the third data frame, and is not responsible for digital signal processing, which helps to reduce a configuration of the remote node device, and reduce a failure probability and maintenance of the remote node device. Therefore, when the client device CPE sends the user data frame to the remote node device, step 1201 of receiving, by using the interface circuit, the user data frame sent by the CPE is performed, and the analog signal processing may be further performed on the received user data frame in the analog format at the same time. Then, continue to perform step 1202.

In step 1202, analog-to-digital conversion is performed on the user data frame in the analog format; therefore, the user data frame that is originally an analog signal is converted to the user data frame in the digital format. Next, the remote node device performs step 1203 of adding the corresponding network frame header to the user data frame in the digital format. For example, if a network between the remote node device and the central node device is Ethernet, an ETH frame header corresponding to Ethernet is added to a digital signal, to obtain the corresponding third data frame, so that the user data frame in the digital format can be carried by the third data frame and is sent to the central node device end by using Ethernet. After frame header addition is completed, the remote node device continues to perform step 1204 of forwarding the third data frame according to a third data frame header of the third data frame, and finally performs step 1205 of sending the forwarded third data frame to a central node device by using a network side interface.

Figure 14:
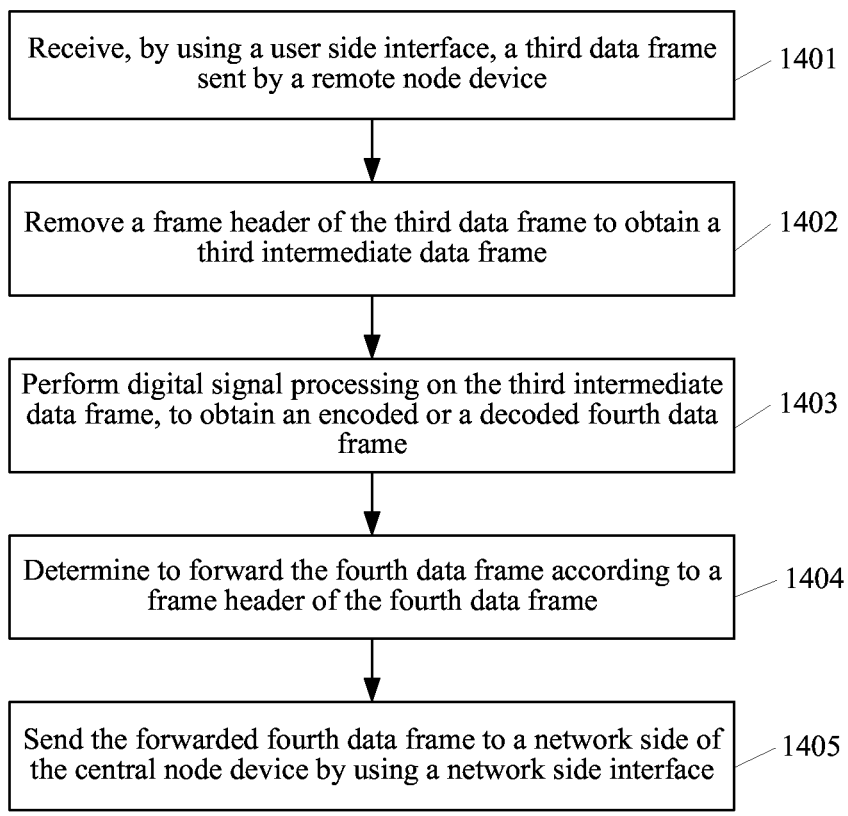
FIG. 14 is a schematic diagram of a process of processing uplink network data by a central node device according to Embodiment 2.

After the remote node device sends the third data frame to the central node device, referring to FIG. 13 and FIG. 14, the central node device performs the following steps.

1401: Receive, by using a user side interface, the third data frame sent by the remote node device.

1402: Remove the frame header of the third data frame to obtain an intermediate data frame.

1403: Perform digital signal processing on the intermediate data frame, to obtain an encoded or a decoded fourth data frame.

1404: Forward the fourth data frame according to a frame header of the fourth data frame.

1405: Send the forwarded fourth data frame to a network side of the central node device by using a network side interface.

In a specific implementation process, because the central node device needs to remove the frame header of the third data frame when performing corresponding digital signal processing, after performing step 1401 of receiving the third data frame, the central node device needs to perform step 1402 of removing the frame header of the third data frame to obtain an intermediate data frame. When the third data frame is a third broadband data frame of a broadband service, in step 1402, the frame header of the third data frame is removed, and physical layer deframing processing is further performed on the third data frame, to obtain the intermediate data frame. After the intermediate data frame is obtained, the central node device performs step 1403 of performing digital signal processing on the intermediate data frame. Specifically, in this embodiment of the present invention, a component such as a digital signal processor is configured in the central node device, and is configured to complete physical layer line encoding/decoding or channel encoding/decoding, or modulation/demodulation on broadband service data, and complete voice encoding/decoding, echo cancellation, DTMF generation and detection on voice service data, so that the remote node device may not perform processing such as digital signal encoding/decoding on the user data frame sent by the user equipment CPE, which therefore reduces a component configuration of the remote node device, reduces a failure probability and maintenance complexity of the remote node device. For a voice service, after the fourth data frame is obtained, Real-Time Transport Protocol RTP encapsulation is performed on the fourth data frame, and subsequently, step 1404 is performed.

1404: Forward the fourth data frame according to a frame header of the fourth data frame. Specifically, the frame header of the fourth data frame includes a destination address of a destination that the fourth data frame reaches, and therefore, the fourth data frame is forwarded based on the destination address. Finally 1405 is performed: Send the forwarded fourth data frame to a network side of central node device by using a network side interface.

Figure 15:
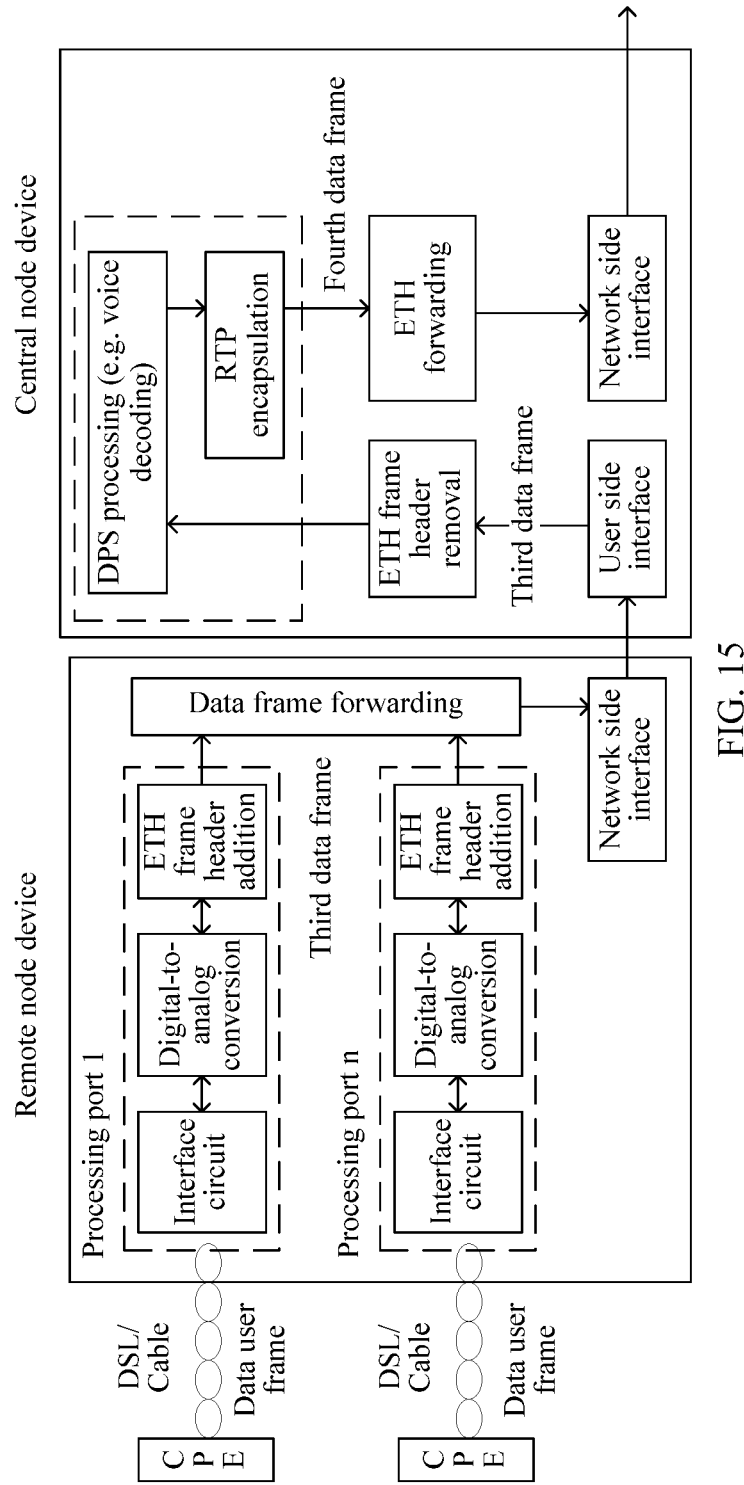
FIG. 15 is a schematic diagram of transmitting an uplink network voice data frame according to Embodiment 2.

Referring to FIG. 15, a method for processing an uplink voice user data frame and a voice data frame by a central node device and a remote node device is described below by using an example in which in a voice access network, user equipment CPE sends a voice user data frame. It is assumed that a network between a central node device and a remote node device and a network on a network side of the central node device are both Ethernet, where a data frame forwarded and transferred in Ethernet is an Ethernet frame: an ETH frame.

In the remote node device, first, a voice user data frame sent by user equipment CPE is received by using an interface circuit SLIC, and at the same time, analog signal processing may be further performed on the voice user data frame, such as telephone line feeding, voice frequency sending, ringing generation, and user off-hook or on-hook signal detection. Then, a third voice user data frame is converted to a voice digital signal. Next, to achieve that the voice digital signal can be sent to the corresponding central node device by using Ethernet, a network frame header is added to the voice data signal. Because the network between the remote node device and the central node device is Ethernet, an Ethernet frame header, that is, an ETH frame header is correspondingly added to obtain a corresponding third voice data frame, so that the voice user data frame can be carried by the third voice data frame to traverse Ethernet between the remote node device and the central node device. After obtaining the third voice data frame, the remote node device forwards the third voice data frame based on a frame header of the third voice data frame, and finally sends the forwarded third voice data frame to the central node device by using a network side interface.

In the central node device, the third voice data frame sent by the remote node device is received by using a user side interface. Then, the frame header of the third voice data frame is removed. Because the third voice data frame is an Ethernet frame, the ETH frame header of the third voice data frame is correspondingly removed, to obtain an intermediate voice data frame corresponding to the third voice data frame. Next, voice encoding processing is performed on the intermediate voice data frame, and RTP encapsulation is performed after the voice encoding processing according to the Real-Time Transport Protocol RTP, to obtain an encapsulated fourth voice data frame. Then, the fourth voice data frame is forwarded according to a frame header of the fourth voice data frame, and finally, the forwarded fourth voice data frame is sent to the network side of the central node device by using a network side interface.

Figure 16:
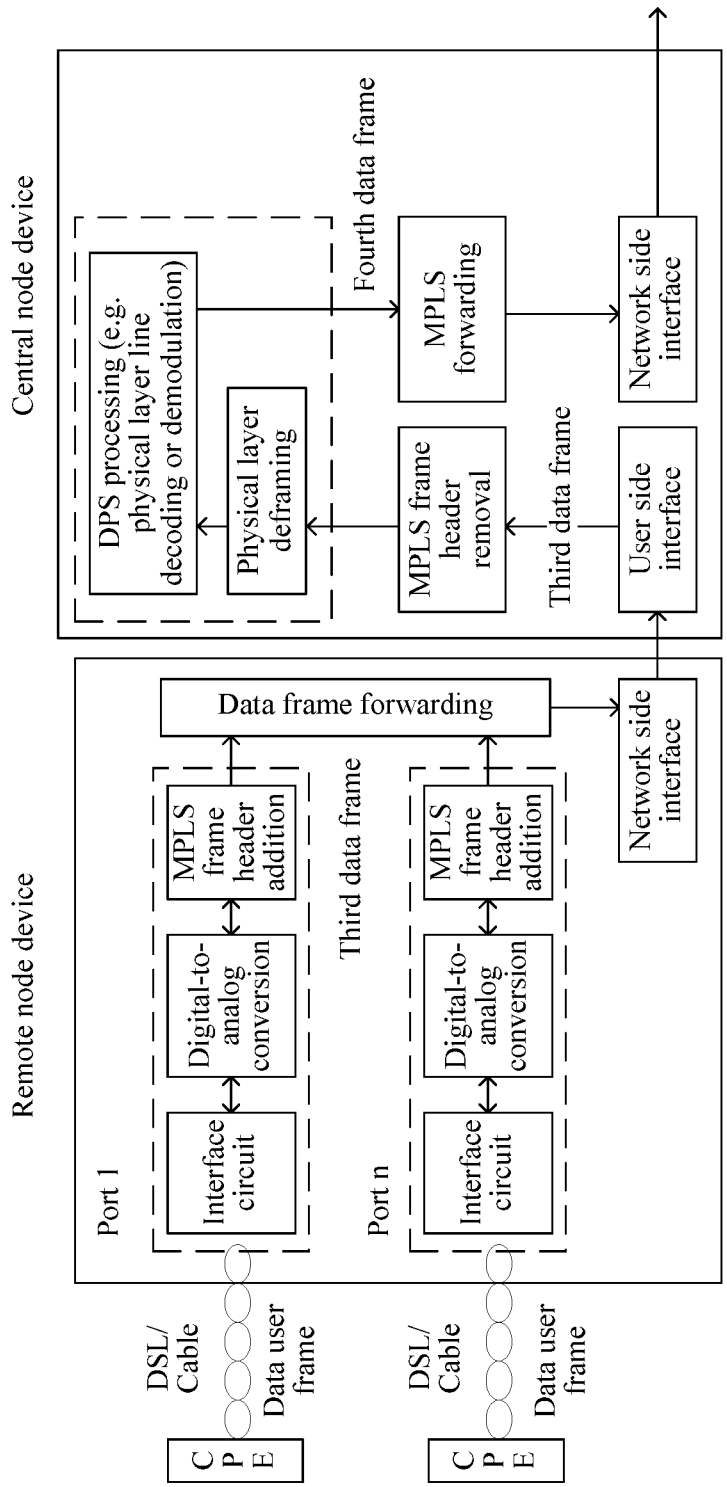
FIG. 16 is a schematic diagram of transmitting an uplink network broadband data frame according to Embodiment 2.

Referring to FIG. 16, a method for processing an uplink broadband user data frame and a broadband data frame by a central node device and a remote node device is described below by using an example in which in a broadband access network, user equipment CPE sends a broadband user data frame. It is assumed that a network between a central node device and a remote node device and a network on a network side of the central node device are both an MPLS network, where a data frame forwarded and transferred in the MPLS network is an MPLS frame.

In the remote node device, first, a broadband user data frame sent by user equipment CPE is received by using an interface circuit SLIC, and analog signal processing is performed on the broadband user data frame. Then, the broadband user data frame in an analog format is converted to a broadband digital signal, that is, a broadband user data frame in a broadband form. Next, to achieve that the broadband digital signal can be sent to the corresponding central node device by using the MPLS network, a network frame header is added to the broadband data signal. Because the network between the remote node device and the central node device is the MPLS network, an MPLS network frame header, that is, an MPLS frame header is correspondingly added to obtain a corresponding third broadband data frame, so that the broadband user data frame can be carried by the third broadband data frame to traverse the MPLS network between the remote node device and the central node device. Subsequently, the third broadband data frame is forwarded according to a frame header of the third broadband data frame, and finally, the forwarded third broadband data frame is sent to the central node device by using a network side interface.

In the central node device, the third broadband data frame sent by the remote node device is received by using a user side interface. Then, the frame header of the third broadband data frame is removed. Because the third broadband data frame is an MPLS network frame, the MPLS frame header of the third broadband data frame is correspondingly removed, and physical layer line deframing processing is performed after frame header removal, to obtain an intermediate broadband data frame corresponding to the third broadband data frame. Next, digital signal processing: physical layer line decoding, demodulation, or the like is performed on the third broadband data, to obtain a fourth broadband data frame. Then, the fourth broadband data frame is forwarded according to a frame header of the fourth broadband data frame, and finally, the forwarded fourth broadband data frame is sent to the network side of the central node device by using a network side interface.

In a specific implementation process, a voice data service not only may be forwarded and transferred in Ethernet, but also may be forwarded and transferred on a network such as the MPLS network or a TDM network, where a principle of a method for processing voice data by the remote node device and the central node device is the same as that of forwarding and transferring the voice data in Ethernet. Similarly, a broadband data service not only may be forwarded and transferred on the MPLS network, but also may be forwarded and transferred in Ethernet, where a principle of a method for processing broadband data by the remote node device and the central node device is the same as that of forwarding and transferring the broadband data on the MPLS network, and is not described herein again.

In the foregoing embodiment, a central node device receives a first data frame from a remote node device and performs uplink digital signal processing, and then sends a data frame obtained after the digital signal processing to a network side, so that when sending the first data frame to the central node device, the remote node device does not need to perform digital signal processing on an uplink data frame, and correspondingly, a digital signal processing unit does not need to be configured in the remote node device, which resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

Embodiment 3

Figure 17:
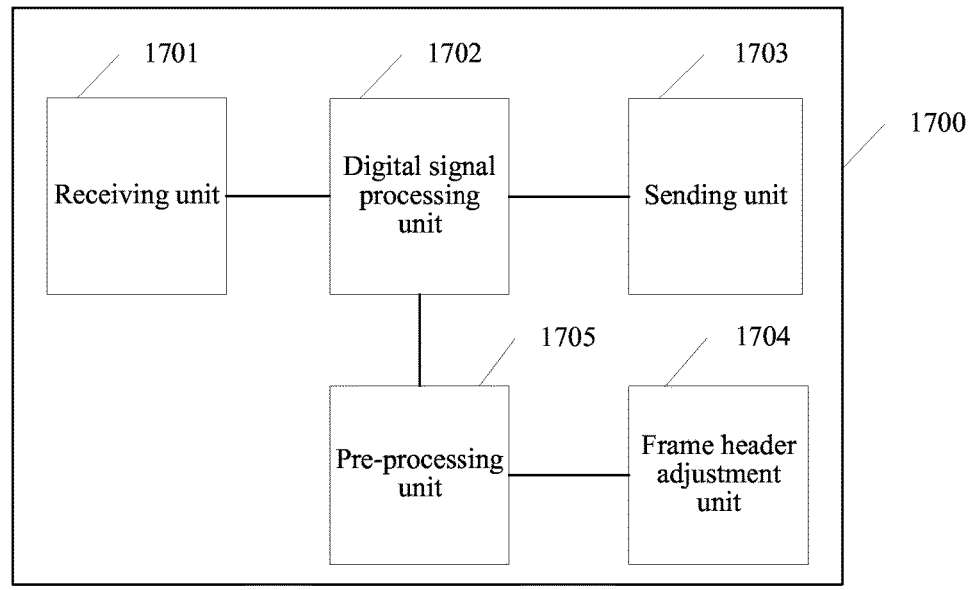
FIG. 17 is a schematic structural diagram of a central node device according to Embodiment 3.

Referring to FIG. 17, this embodiment provides a central node device 1700, where the central node device 1700 is applied to a data transmission network, and the data transmission network includes the central node device 1700 and a remote node device, where the central node device 1700 is an edge device of a backbone network in the data transmission network, and the remote node device is an edge device of a user network in the data transmission network. The central node device 1700 includes a receiving unit 1701, configured to receive a first data frame from a network side, a digital signal processing unit 1702, configured to perform downlink digital signal processing on the first data frame to obtain a downlink to-be-sent data frame, and a sending unit 1703, configured to send the downlink to-be-sent data frame to the remote node device.

In a specific implementation process, the central node device 1700 further includes: a frame header adjustment unit 1704, configured to: before the downlink digital signal processing is performed on the first data frame to obtain the downlink to-be-sent data, copy or remap a first frame header of the first data frame to obtain a second frame header, where a same parameter in the second frame header obtained by means of remapping and in the first frame header corresponds to different parameter values.

The sending unit 1703 is specifically configured to encapsulate the downlink to-be-sent data frame by using the second frame header, to obtain a second data frame, and send the second data frame to the remote node device to the remote node device.

In a specific implementation process, the central node device 1700 further includes: a pre-processing unit 1705, configured to: after the first frame header of the first data frame is copied or remapped to obtain the second frame header, and before the downlink digital signal processing is performed on the first data frame to obtain the downlink to-be-sent data frame, perform physical layer framing processing on the first data frame when the first data frame is a broadband data frame; or perform Real-Time Transport Protocol layer decapsulation processing on the first data frame when the first data frame is a voice data frame.

In a specific implementation process, the pre-processing 1704 is specifically configured to: when a network between the central node device 1700 and the remote node device is different from a network of the network side, remap the first frame header to obtain the second frame header; or when a network between the central node device 1700 and the remote node device is the same as a network of the network side, copy the first frame header to obtain the second frame header or remap the first frame header to obtain the second frame header.

Variations and specific examples in the foregoing method for processing downlink network data are also applicable to the central node device 1700 in this embodiment. According to detailed descriptions of the foregoing method for processing downlink network data, a person skilled in the art may clearly understand an implementation method of the central node device 1700 in this embodiment; therefore, for brevity of the specification, details are not described herein again.

In the foregoing embodiment, a digital signal processing unit is configured in the central node device 1700; and the central node device 1700 performs downlink digital signal processing on a first data frame from a network side, and then sends a data frame obtained after the digital signal processing to a remote node device, so that the remote node device does not need to further perform digital signal processing on a downlink network data frame, and correspondingly, the digital signal processing unit does not need to be configured in the remote node device, which therefore resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

Embodiment 4

Figure 18:
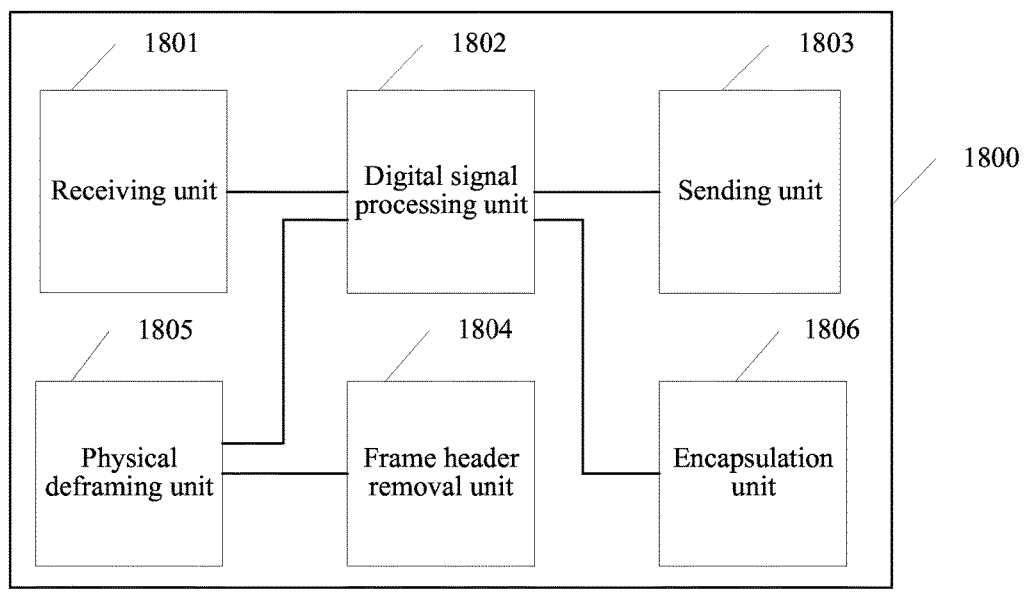
FIG. 18 is a schematic structural diagram of a central node device according to Embodiment 4.

Referring to FIG. 18, this embodiment provides a central node device 1800, where the central node device 1800 is applied to a data transmission network, and the data transmission network includes the central node device 1800 and a remote node device, where the central node device 1800 is an edge device of a backbone network in the data transmission network, and the remote node device is an edge device of a user network in the data transmission network; and the central node device 1800 includes: a receiving unit 1801, configured to receive a first data frame from the remote node device; a digital signal processing unit 1802, configured to perform uplink digital signal processing on a second data frame in the first data frame to obtain an uplink to-be-sent data frame; and a sending unit 1803, configured to send the uplink to-be-sent data frame to a network side.

In a specific implementation process, the central node device 1800 further includes: a frame header removal unit 1804, configured to: before the uplink digital signal processing is performed on the second data frame included in the first data frame to obtain the uplink to-be-sent data frame, remove a frame header of the first data frame to obtain the second data frame.

In a specific implementation process, the central node device 1800 further includes: a physical deframing unit 1805, configured to: after the frame header of the first data frame is removed to obtain the second data frame, and before the uplink digital signal processing is performed on the second data frame in the first data frame to obtain the uplink to-be-sent data frame, perform physical layer deframing processing on the second data frame when the first data frame received by the central node device 1800 is a broadband data frame.

In a specific implementation process, the central node device 1800 further includes: an encapsulation unit 1806, configured to: after the uplink digital signal processing is performed on the second data frame in the first data frame to obtain the uplink to-be-sent data frame, and before the uplink to-be-sent data frame is sent to the network side, perform encapsulation processing on the second data frame according to the Real-Time Transport Protocol when the first data frame received by the central node device 1800 is a voice data frame.

Variations and specific examples in the foregoing method for processing uplink network data are also applicable to the central node device 1800 in this embodiment. According to detailed descriptions of the foregoing method for processing uplink network data, a person skilled in the art may clearly understand an implementation method of the central node device 1800 in this embodiment; therefore, for brevity of the specification, details are not described herein again.

In a specific implementation process, functional units in FIG. 17 and FIG. 18 may be configured in a same entity device, that is, the central node device 1800 select different functional units according to needs, which may implement processing of downlink network data as well as processing of network uplink data.

In the foregoing embodiment, a digital signal processing unit is configured in the central node device 1800; and the central node device 1800 performs uplink digital signal processing on a first data frame from a remote node device, and then sends a data frame obtained after the digital signal processing to a network side, so that when sending the first data frame to the central node device 1800, the remote node device does not need to perform digital signal processing on an uplink data frame, and correspondingly, the digital signal processing unit does not need to be configured in the remote node device, which resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

Embodiment 5

Figure 19:
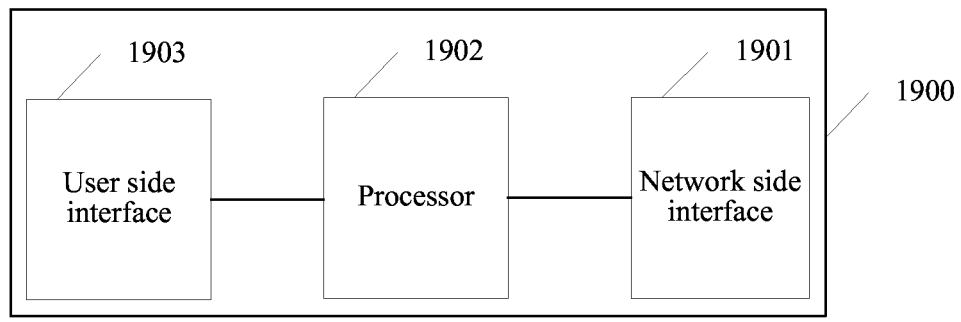
FIG. 19 is a schematic structural diagram of a central node device according to Embodiment 5.

Referring to FIG. 19, this embodiment provides a central node device 1900, where the central node device 1900 is applied to a data transmission network, and the data transmission network includes the central node device 1900 and a remote node device, where the central node device 1900 is an edge device of a backbone network in the data transmission network, and the remote node device is an edge device of a user network in the data transmission network; and the central node device 1900 includes: a network side interface 1901, configured to receive a data frame from a network side, and send an uplink to-be-sent data frame to the network side; a processor 1902, connected to the network side interface 1901 and a user side interface 1903, and configured to perform downlink digital signal processing on a data frame transferred from the network side interface to obtain a downlink to-be-sent data frame, and perform uplink digital signal processing on a data frame transferred from the user side interface to obtain the uplink to-be-sent data frame; and the user side interface 1903, configured to receive a data frame from the remote node device, and send the downlink to-be-sent data frame to the remote node device.

In a specific implementation process, the central node device 1900 further includes a memory that is configured to store to-be-processed data, and the processor 1902 includes a digital signal processor DSP, configured to perform digital signal processing on uplink and downlink data.

In an actual application process, when receiving a first data frame, the network side interface 1901 transfers the first data frame to the processor 1902. The processor 1902 first copies or remaps a first frame header of the first data frame to obtain a second frame header, where a same parameter in the second frame header obtained by means of remapping and in the first frame header corresponds to different parameter values. Then, the processor 1902 performs encapsulation or decapsulation processing on the first data frame, and transfers data obtained after the processing to the digital signal processor DSP, where when the first data frame is a broadband data frame, the processor 1902 performs physical layer framing processing on the first data frame; or when the first data frame is voice data frame, the processor 1902 performs Real-Time Transport Protocol layer decapsulation processing on the first data frame. Subsequently, the processor 1902 performs, by using the digital signal processor DSP, downlink digital signal processing on the data obtained after the processing. Next, the processor 1902 encapsulates a downlink to-be-sent data frame by using the second frame header obtained by means of copying or remapping, to obtain a second data frame, and transfers the second data frame to the user side interface 1903. Finally, the user side interface 1903 sends the second data frame to the remote node device, so as to send the downlink to-be-sent data frame to the remote node device.

Correspondingly, when receiving a first data frame from the remote node device, the user side interface transfers the first data frame to the processor 1902. The processor 1902 first removes a frame header of the first data frame to obtain a second data frame. Then, for voice data frame, the processor 1902 further performs uplink digital signal processing on the second data frame to obtain an uplink to-be-sent data frame, next encapsulates the uplink to-be-sent data frame according to the Real-Time Transport Protocol, and transfers encapsulated uplink to-be-sent data frame to the network side interface; or for a broadband data frame, the processor 1902 first performs physical layer deframing processing on the second data frame, then performs digital signal processing on deframed data to obtain a to-be-sent data frame, and transfers the to-be-sent data frame to the network side interface. Finally, the network side interface 1901 sends the uplink to-be-sent data frame to the network side.

Variations and specific examples in the foregoing method for processing uplink and downlink network data are also applicable to the central node device 1900 in this embodiment. According to detailed descriptions of the foregoing method for processing uplink and downlink network data, a person skilled in the art may clearly understand an implementation method of the central node device 1900 in this embodiment; therefore, for brevity of the specification, details are not described herein again.

A digital signal processing unit is configured in the central node device 1900; and the central node device 1900 performs uplink and downlink digital signal processing on uplink and downlink network data frames, and then sends a data frame obtained after the digital signal processing to the remote node device, so that the remote node device does not need to perform digital signal processing on the uplink and downlink data frames, and correspondingly, the digital signal processing unit does not need to be configured in the remote node device, which therefore resolves a technical problem that operation and maintenance management of a remote node device is complex in the prior art, thereby reducing complexity of the operation and maintenance management of the remote node device, reducing a failure rate of the remote node device, and further reducing costs of the operation and maintenance management of the remote node device.

Embodiment 6

Figure 20:
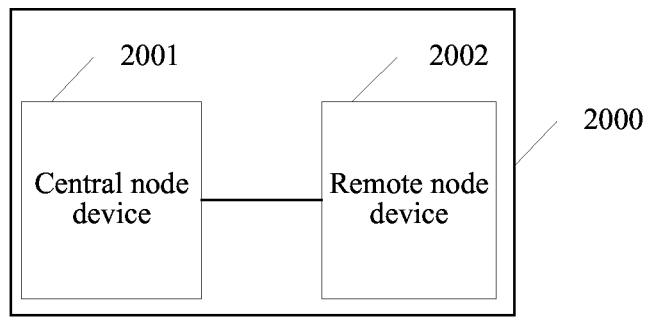
FIG. 20 is a schematic structural diagram of a system for processing downlink network data according to Embodiment 6.

Referring to FIG. 20, embodiments provide a system 2000 for processing downlink network data, where the system is applied to a data transmission network, and the data transmission network includes a central node device 2001 and a remote node device 2002, where the central node device 2001 is an edge device of a backbone network in the data transmission network, and the remote node device 2002 is an edge device of a user network in the data transmission network; and the system 2000 includes: the central node device 2001, configured to perform downlink digital signal processing on a first data frame received from a network side, to obtain a first downlink to-be-sent data frame, and send the first downlink to-be-sent data frame to the remote node device; and the remote node device 2002, configured to perform downlink frame header removal processing on the received first downlink to-be-sent data frame to obtain a second downlink to-be-sent data frame, and send the second downlink to-be-sent data frame to a client device.

Variations and specific examples in the foregoing method for processing downlink network data are also applicable to the system for processing downlink network data in this embodiment. According to detailed descriptions of the foregoing method for processing downlink network data, a person skilled in the art may clearly understand an implementation method of the system for processing downlink network data in this embodiment; therefore, for brevity of the specification, details are not described herein again.

In the system for processing downlink network data, the central node device 2001 receives a first data frame from the network side and performs downlink digital signal processing, and then sends a data frame obtained after the digital signal processing to the remote node device, so that the remote node device 2002 does not need to further perform digital signal processing on a downlink network data frame, and correspondingly, a digital signal processing unit does not need to be configured in the remote node device 2002, which therefore resolves a technical problem that operation and maintenance management of a remote node device 2002 is complex in the prior art, thereby reducing complexity of the operation and maintenance management of the remote node device 2002, reducing a failure rate of the remote node device 2002, and further reducing costs of the operation and maintenance management of the remote node device 2002.

Embodiment 7

Figure 21:
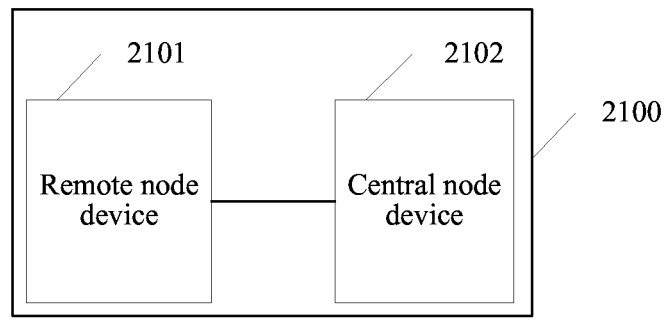
FIG. 21 is a schematic structural diagram of a system for processing uplink network data according to Embodiment 7.

Referring to FIG. 21, embodiments provide a system 2100 for processing uplink network data, where the system is applied to a data transmission network, and the data transmission network includes a central node device 2102 and a remote node device, where the central node device 2102 is an edge device of a backbone network in the data transmission network, and the remote node device 2101 is an edge device of a user network in the data transmission network; and the system 2100 includes: the remote node device 2101, configured to perform uplink frame header addition processing on a first data frame received from a client device, to obtain a first uplink to-be-sent data frame, and send the first uplink to-be-sent data frame to the central node device 2102; and the central node device 2102, configured to perform uplink digital signal processing on a second data frame in the received first uplink to-be-sent data frame to obtain a second uplink to-be-sent data frame, and send the second uplink to-be-sent data frame to a network side.

Variations and specific examples in the foregoing method for processing uplink network data are also applicable to the system for processing uplink network data in this embodiment. According to detailed descriptions of the foregoing method for processing uplink network data, a person skilled in the art may clearly understand an implementation method of the system for processing uplink network data in this embodiment; therefore, for brevity of the specification, details are not described herein again.

By means of one or more technical solutions in this embodiment of the present invention, the following technical effects may be achieved:

In a process of transmitting downlink network data, the central node device 2102 receives a first data frame from the network side and performs downlink digital signal processing, and then sends a data frame obtained after the digital signal processing to the remote node device, so that the remote node device 2101 does not need to further perform digital signal processing on a downlink network data frame, and correspondingly, a digital signal processing unit does not need to be configured in the remote node device 2101, which resolves a technical problem that operation and maintenance management of a remote node device 2101 is complex in the prior art, thereby reducing complexity of the operation and maintenance management of the remote node device 2101, reducing a failure rate of the remote node device 2101, and further reducing costs of the operation and maintenance management of the remote node device 2101.

A person skilled in the art should understand that the embodiments may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

receiving, by a central node device, a first data frame from a network side, wherein a data transmission network comprises the central node device and a remote node device, the central node device is an edge device of a backbone network in the data transmission network, and the remote node device is an edge device of a user network in the data transmission network;

copying or remapping, by the central node device, a first frame header of the first data frame to obtain a second frame header, wherein a parameter in the second frame header and a parameter in the first frame header are a same parameter but correspond to different parameter values;

in response to the first data frame being a broadband data frame, adding, by the central node device, a physical layer protocol frame header on the first data frame;

performing, by the central node device, downlink digital signal processing on the first data frame to obtain a downlink to-be-sent data frame;

encapsulating, by the central node device, a physical layer preamble and the second frame header to the downlink to-be-sent data frame, to obtain a second data frame, wherein a frame header of the second data frame is the second frame header, and the second data frame is routed according to the second frame header, and wherein in the second data frame the second frame header is immediately adjacent to the physical layer preamble, the physical layer preamble is immediately adjacent to the physical layer protocol frame header of the downlink to-be-sent data frame, and the physical layer protocol frame header is before the first frame header of the downlink to-be-sent data frame in the second data frame the physical layer preamble and the physical layer protocol frame header are both located between the second frame header and the downlink to-be-sent data frame; and sending the second data frame to the remote node device, wherein the first data frame and the second data frame are broadband Multi-Protocol Label Switching (MPLS) frames or broadband Ethernet (ETH) frames.

2. The method according to claim 1, wherein the copying or remapping, by the central node device, the first frame header of the first data frame to obtain the second frame header further comprises:

in response to a network between the central node device and the remote node device being different from a network of the network side, remapping, by the central node device, the first frame header to obtain the second frame header; or in response to a network between the central node device and the remote node device being the same as a network of the network side, copying or remapping the first frame header to obtain the second frame header.

3. A method, comprising:

receiving, by a central node device, a first data frame from a remote node device, wherein a data transmission network comprises the central node device and the remote node device, wherein the central node device is an edge device of a backbone network in the data transmission network, and the remote node device is an edge device of a user network in the data transmission network, wherein the first data frame comprises a first frame header and a second data frame, and wherein the first frame header is immediately adjacent to a physical layer preamble, the physical layer preamble is immediately adjacent to a physical layer protocol frame header of the second data frame, and the physical layer protocol frame header is before a second frame header of the second data frame;

removing, by the central node device, a physical layer preamble and the first frame header of the first data frame to obtain the second data frame;

in response to the first data frame received by the central node device being a broadband data frame, and after the physical layer preamble and the first frame header of the first data frame are removed, performing, by the central node device, physical layer deframing processing on the second data frame, wherein the first data frame and the second data frame are broadband Multi-Protocol Label Switching (MPLS) frames or broadband Ethernet (ETH) frames;

after performing the physical layer deframing processing on the second data frame, performing, by the central node device, uplink digital signal processing on the second data frame comprised in the first data frame to obtain an uplink to-be-sent data frame, wherein the first frame header of the first data frame is a copied or remapped frame header of the second frame header of the second data frame, wherein a parameter in the first frame header and a parameter in the second frame header are a same parameter but correspond to different parameter values a frame header of the first data frame is different from a frame header of the second data frame, and wherein performing the uplink digital signal processing on the second data frame comprised in the first data frame to obtain an uplink to-be-sent data frame comprises:

when the second data frame comprises broadband data, performing encoding or decoding on the broadband data, or performing modulation or demodulation on the broadband data; and when the second data frame comprises voice data, performing voice encoding or voice decoding on the voice data, or performing echo cancellation on the voice data, or performing dual tone multiple frequency generation and detection on the voice data; and sending, by the central node device, the uplink to-be-sent data frame to a network side.

4. A central node device, comprising:

a receiver, configured to receive a first data frame from a network side, wherein a data transmission network comprises the central node device and a remote node device, wherein the central node device is an edge device of a backbone network in the data transmission network, and the remote node device is an edge device of a user network in the data transmission network;

a processor, configured to:

copy or remap a first frame header of the first data frame to obtain a second frame header, wherein a parameter in the second frame header and a parameter in the first frame header are a same parameter but correspond to different parameter values;

in response to the first data frame being a broadband data frame, add a physical layer protocol frame header on the first data frame; and perform downlink digital signal processing on the first data frame to obtain a downlink to-be-sent data frame; and a transmitter, configured to:

encapsulate a physical layer preamble and the second frame header to the downlink to-be-sent data frame to obtain a second data frame, and send the second data frame to the remote node device, wherein the first data frame and the second data frame are broadband Multi-Protocol Label Switching (MPLS) frames or broadband Ethernet (ETH) frame, wherein a frame header of the second data frame is the second frame header, and the second data frame is routed according to the second frame header, and wherein in the second data frame the second frame header is immediately adjacent to the physical layer preamble, the physical layer preamble is immediately adjacent to the physical layer protocol frame header of the downlink to-be-sent data frame, and the physical layer protocol frame header is before the first frame header of the downlink to-be-sent data frame the physical layer preamble and the physical layer protocol frame header are both located between the second frame header and the downlink to-be-sent data frame.

5. The central node device according to claim 4, wherein the processor is further configured to:

in response to a network between the central node device and the remote node device being different from a network of the network side, remap the first frame header to obtain the second frame header; or in response to a network between the central node device and the remote node device being the same as a network of the network side, copy or remap the first frame header to obtain the second frame header.

6. A central node device, comprising:

a receiver, configured to receive a first data frame from a remote node device, wherein a data transmission network comprises the central node device and the remote node device, wherein the central node device is an edge device of a backbone network in the data transmission network, and the remote node device is an edge device of a user network in the data transmission network, and wherein the first data frame comprises a first frame header and a second data frame, wherein in the first data frame the first frame header is immediately adjacent to a physical layer preamble, the physical layer preamble is immediately adjacent to a physical layer protocol frame header of the second data frame, and the physical layer protocol frame header is before a second frame header of the second data frame;

a processor, configured to:

remove the physical layer preamble and the first frame header of the first data frame to obtain the second data frame;

in response to the first data frame received by the central node device being a broadband data frame, and after the physical layer preamble and the first frame header of the first data frame are removed, perform physical layer deframing processing on the second data frame, wherein the first data frame and the second data frame are broadband Multi-Protocol Label Switching (MPLS) frames or broadband Ethernet (ETH) frames; and after performing physical layer deframing processing on the second data frame, perform uplink digital signal processing on the second data frame comprised in the first data frame to obtain an uplink to-be-sent data frame, wherein the first frame header of the first data frame is a copied or remapped frame header of the second frame header of the second data frame, wherein a parameter in the first frame header and a parameter in the second frame header are a same parameter but correspond to different parameter values a frame header of the first data frame is different from a frame header of the second data frame, and wherein performing the uplink digital signal processing on the second data frame comprises:

when the second data frame comprises broadband data, performing encoding or decoding on the broadband data, or performing modulation or demodulation on the broadband data; and when the second data frame comprises voice data, performing voice encoding or voice decoding on the voice data, or performing echo cancellation on the voice data, or performing dual tone multiple frequency generation and detection on the voice data; and a transmitter, configured to send the uplink to-be-sent data frame to a network side.

7. The central node device according to claim 6, wherein the processor is further configured to:

after uplink digital signal processing is performed on the second data frame comprised in the first data frame to obtain the uplink to-be-sent data frame, and before the uplink to-be-sent data frame is sent to the network side, perform encapsulation processing on the second data frame according to Real-Time Transport Protocol in response to the first data frame received by the central node device being a voice data frame.

8. A system, comprising:

a central node device, comprising a processor, configured to:

copy or remap a first frame header of a first data frame to obtain a second frame header, wherein a data transmission network comprises the central node device and a remote node device, wherein the central node device is an edge device of a backbone network in the data transmission network, and the remote node device is an edge device of a user network in the data transmission network, wherein a parameter in the second frame header and a parameter in the first frame header are a same parameter but correspond to different parameter values;

in response to the first data frame being a broadband data frame, add a physical layer protocol frame header on the first data frame;

after obtaining the second frame header, perform downlink digital signal processing on a first data frame received from a network side, to obtain a first downlink to-be-sent data frame, and send the first downlink to-be-sent data frame to the remote node device, wherein performing downlink digital signal processing on the first data frame to obtain the first downlink to-be-sent data frame, and sending the first downlink to-be-sent data frame to the remote node device, comprises:

encapsulating a physical layer preamble and the second frame header to the first downlink to-be-sent data frame to obtain a second data frame, and sending the second data frame to the remote node device, wherein the first data frame and the second data frame are broadband Multi-Protocol Label Switching (MPLS) frames or broadband Ethernet (ETH) frames, wherein a frame header of the second data frame is the second frame header, and the second data frame is routed according to the second frame header, and wherein in the second data frame the second frame header is immediately adjacent to the physical layer preamble, the physical layer preamble is immediately adjacent to the physical layer protocol frame header of the first downlink to-be-sent data frame, and the physical layer protocol frame header is before the first frame header of the first downlink to-be-sent data frame the physical layer preamble and the physical layer protocol frame header are both located between the second frame header and the first downlink to-be-sent data frame; and the remote node device, comprising a processor, configured to perform downlink frame header removal processing on the first downlink to-be-sent data frame to obtain a second downlink to-be-sent data frame, and send the second downlink to-be-sent data frame to a client device.

* * * * *